United States Patent
Matsui

(10) Patent No.: US 9,293,118 B2
(45) Date of Patent: Mar. 22, 2016

(54) CLIENT DEVICE

(71) Applicant: SONY MOBILE COMMUNICATIONS INC., Minato-ku (JP)

(72) Inventor: Daisuke Matsui, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 270 days.

(21) Appl. No.: 13/755,896

(22) Filed: Jan. 31, 2013

(65) Prior Publication Data

US 2013/0257907 A1   Oct. 3, 2013

Related U.S. Application Data

(60) Provisional application No. 61/617,731, filed on Mar. 30, 2012.

(51) Int. Cl.
| | |
|---|---|
| *G09G 5/377* | (2006.01) |
| *G06F 3/01* | (2006.01) |
| *G06T 7/00* | (2006.01) |
| *G06T 19/00* | (2011.01) |
| *H04M 1/725* | (2006.01) |

(52) U.S. Cl.
CPC ............... *G09G 5/377* (2013.01); *G06F 3/011* (2013.01); *G06T 7/0044* (2013.01); *G06T 19/006* (2013.01); *G06T 2207/30204* (2013.01); *H04M 1/72522* (2013.01)

(58) Field of Classification Search
None
See application file for complete search history.

(56) References Cited

U.S. PATENT DOCUMENTS

| | | | |
|---|---|---|---|
| 6,522,312 B2* | 2/2003 | Ohshima et al. | 345/8 |
| 2007/0002037 A1* | 1/2007 | Kuroki et al. | 345/418 |
| 2009/0037101 A1* | 2/2009 | Koike | G01C 21/3664 701/533 |
| 2010/0208033 A1* | 8/2010 | Edge et al. | 348/46 |
| 2010/0287485 A1* | 11/2010 | Bertolami et al. | 715/764 |
| 2012/0032877 A1* | 2/2012 | Watkins et al. | 345/156 |
| 2012/0079426 A1* | 3/2012 | Jin et al. | 715/810 |
| 2012/0224062 A1* | 9/2012 | Lacoste et al. | 348/148 |
| 2013/0042296 A1* | 2/2013 | Hastings et al. | 726/1 |
| 2013/0050499 A1* | 2/2013 | Siklossy et al. | 348/169 |
| 2013/0222426 A1* | 8/2013 | Hymel | 345/633 |

FOREIGN PATENT DOCUMENTS

JP   2011-107893   6/2011

* cited by examiner

*Primary Examiner* — Xiao Wu
*Assistant Examiner* — Steven Elbinger
(74) *Attorney, Agent, or Firm* — Oblon, McClelland, Maier & Neustadt, L.L.P.

(57) ABSTRACT

An information processing apparatus comprising an image recognition unit that detects whether an image preset as a marker image exists in a captured image; a spatial recognition unit that, when the marker image is detected by the image recognition unit, constructs a real-world coordinate system computed from a position and orientation of the marker image, and computes information corresponding to a position and orientation of the information processing apparatus in the constructed real-world coordinate system; and a virtual object display unit that acquires at least one of the data stored in the storage unit, data existing on a network, and data transmitted from the one or more other information processing apparatuses and received by the communication interface, places the acquired data in the constructed real-world coordinate system, and controls the display unit to display the acquired data as one or more virtual objects.

17 Claims, 21 Drawing Sheets

Ar14

Ar15

Ar14

106, 107a 106, 107a

Ar16

CLIENT DEVICE

CROSS REFERENCE TO RELATED APPLICATION

The present application claims the benefit of the earlier filing date of U.S. Provisional Patent Application Ser. No. 61/617,731 filed on Mar. 30, 2012, the entire contents of which is incorporated herein by reference.

BACKGROUND

1. Field of the Disclosure

The present disclosure relates to a client device, and more specifically, relates to augmented reality technology that overlays virtual information onto information given by perceptions from a real-world environment.

2. Description of Related Art

In recent years, attention has been focusing on augmented reality technology, in which computer-generated virtual information (virtual objects) are overlaid onto information given by perceptions from a real-world environment. In order to superimpose a virtual object over the real world, it is necessary to align the position and orientation of the camera capturing the virtual object (the virtual camera) with the position and orientation of the camera capturing the real world. Acquisition of the position and orientation of the camera capturing the real world is possible by a technique such as calculation from image information regarding a marker image appearing in a captured image captured by a camera.

For the marker image, an image with a known shape, design, or other feature is prepared in advance. The marker image is placed at a given position over a real-world space, and the marker image is recognized by a camera. Then, the position and orientation of the camera in the real-world coordinate system, being a coordinate system for the real world, is back-calculated from the position and shape of the marker image contained in an image being captured by the camera. Once information on the position and orientation of the camera in the real-world coordinate system is obtained, that information can be used to generate a virtual object, and the generated virtual object can be superimposed over a captured image.

If position information and orientation information is mutually shared among users in a virtual space provided by such augmented reality, virtual information according to each person's position and orientation can be displayed. For example, Japanese Unexamined Patent Application Publication No. 2011-107893 describes technology configured such that a virtual space can be shared with other client devices by ascertaining position information regarding the other client devices.

However, with the technology described in Japanese Unexamined Patent Application Publication No. 2011-107893, position information regarding other client devices is acquired on the basis of shape information and the positions of other client devices included in a captured image from a camera. For this reason, sharing the same virtual space among a plurality of users requires that other client devices wanting to share the virtual space must be inside that space.

SUMMARY

The inventors of the present disclosure have recognized the advantageous effects to configure it such that a common virtual space can be shared among a plurality of users, even in cases where images of other client devices are not included in a captured image from a camera.

According to an exemplary embodiment, the disclosure is directed to an information processing apparatus comprising: an image recognition unit that detects whether an image preset as a marker image exists in a captured image; a spatial recognition unit that, when the marker image is detected by the image recognition unit, constructs a real-world coordinate system computed from a position and orientation of the marker image, and computes information corresponding to a position and orientation of the information processing apparatus in the constructed real-world coordinate system; a virtual object display unit that acquires at least one of the data stored in the storage unit, data existing on a network, and data transmitted from the one or more other information processing apparatuses and received by the communication interface, places the acquired data in the constructed real-world coordinate system, and controls the display unit to display the acquired data as one or more virtual objects; and a controller that controls the communication interface to transmit information corresponding to the position and orientation of the information processing apparatus in the constructed real-world coordinate system to the one or more other information processing apparatuses.

By configuring and processing in this way, a real-world coordinate system shared among client devices is constructed and virtual objects are placed at coordinates therein by the virtual object display processor, regardless of position or orientation from which a marker image is captured by the imaging unit.

According to an embodiment of the present disclosure, it becomes possible to share a common virtual space among a plurality of users, even in cases where images of other client devices are not included in a captured image from a camera.

DETAILED DESCRIPTION

Hereinafter, an exemplary client device according to an embodiment of the present disclosure will be described in the following order and with reference to the drawings.
1. Information processing system
2. Exemplary configuration of mobile phone client device
3. Exemplary information processing in mobile phone client device
4. Modifications
[1. Overview of Information Processing System]

Figure 1:
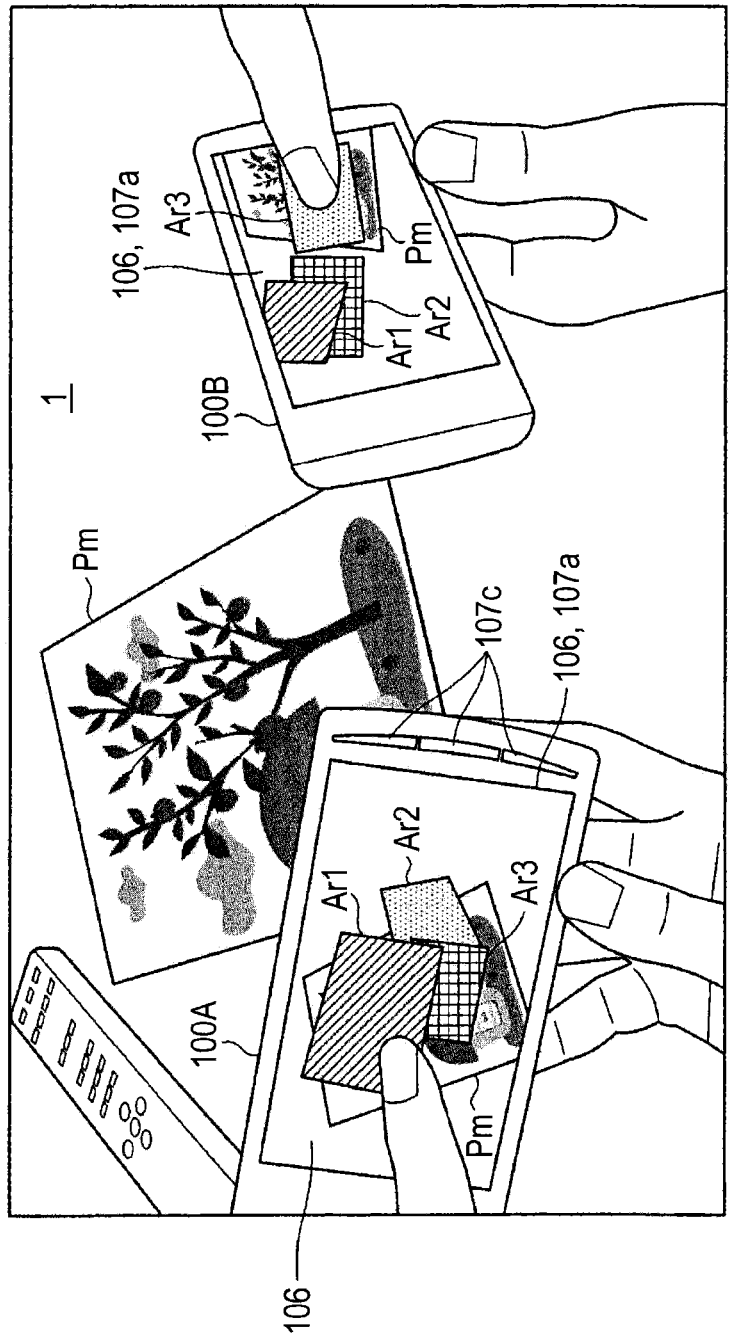
FIG. 1 is a schematic diagram according to an embodiment of the present disclosure, illustrating an exemplary configuration of an information processing system.

The information processing system 1 illustrated in FIG. 1 is composed of a mobile phone client device 100A and a mobile phone client device 100B. The mobile phone client device 100A and the mobile phone client device 100B are provided with a display unit 106 consisting of an LCD (Liquid Crystal Display), organic EL (Electro-Luminescence), or other display, and a touch panel 107a (touch sensor) that is stacked or integrally formed with the display unit 106. An imaging unit (camera) not illustrated is provided on the back side of the case opposite the side where the display unit 106 and the touch panel 107a are provided. Captured images captured by the imaging unit are displayed on the display unit 106.

In addition, the mobile phone client device 100A and the mobile phone client device 100B include functions for displaying data on the screen of the display unit 106 as a virtual object, such data being data stored in a storage unit not illustrated or data such as still images existing on a network, for example. FIG. 1 illustrates how a virtual object Ar1, a virtual object Ar2, and a virtual object Ar3 are displayed on the screens of the respective display units 106 of the mobile phone client device 100A and the mobile phone client device 100B. These virtual objects Ar are placed in a real-world coordinate system obtained by analyzing captured images from the imaging unit.

In the present embodiment, the question of which data to select as a virtual object Ar from among data existing in the storage unit or the network, as well as the question of where to set its placement position, are determined on the basis of the number and position of touches made by a user with respect to the touch panel 107a. However, the question of which data to select as a virtual object Ar and at what position to place (display) it is not limited to this technique, and other techniques will be discussed later as various modifications.

A real-world coordinate system is constructed by a spatial recognition unit not illustrated, as a result of the spatial recognition unit recognizing a marker image Pm in a captured image. Also, the positions of virtual objects Ar displayed on the screen of the display unit 106 are moved to arbitrary positions by user touch operations made with respect to the touch panel 107a.

The mobile phone client device 100A and the mobile phone client device 100B are provided with functions for communicating wirelessly, transmitting and receiving data to each other via wireless communication. Specifically, source data to be displayed as virtual objects Ar, information on the positions and orientations of such data in the real-world coordinate system, and information on a device's own position and orientation in the real-world coordinate system, etc. is transmitted and received. For the wireless communication standard, Bluetooth (registered trademark), Wi-Fi Direct, Wireless HD (High Definition), WiGig (Wireless Gigabit), WHDI (Wireless Home Digital Interface), infrared, and NFC (Near Field Communication) are applicable, for example.

Although the present embodiment gives as an example the case where the client devices constituting the information processing system 1 are a mobile phone client device 100A and a mobile phone client device 100B, an embodiment is not limited thereto. The number of mobile phone client devices 100 may also be three or more. Furthermore, the type of client device is not limited to being a mobile phone client device. Other client devices such as tablet devices, videogame consoles, audio players, and personal computers are also applicable insofar as the device is provided with wireless communication functions.

[2. Exemplary Configuration of Mobile Phone Client Device]

Next, an exemplary configuration of the mobile phone client device 100A and the mobile phone client device 100B will be described with reference to FIG. 2. Since the mobile phone client device 100A and the mobile phone client device 100B share the same internal configuration, the description herein will be given for a mobile phone client device 100.

The mobile phone client device 100 is provided with an antenna 101 that transmits and receives radio waves to and from a wireless telephone base station, a communication processor 102 connected to the antenna 101, and a controller 110. Also provided are an audio processor 103, a speaker 104, and a microphone 105.

The communication processor 102 wirelessly communicates with a wireless telephone base station, under control by the controller 110. During audio telephony, audio data included in data received by the communication processor 102 is supplied to the audio processor 103. Then, an audio data decoding process is conducted by the audio processor 103, and an analog audio signal is obtained. The analog audio signal obtained by the audio processor 103 is supplied to the speaker 104 and output as audio. An audio signal obtained as a result of audio pickup by the microphone 105 is also supplied to the audio processor 103, and the audio data is encoded by the audio processor 103 into a given encoding format. Then, the obtained audio data is supplied to the communication processor 102 and emitted as a wireless radio wave via the antenna 101.

Additionally, the communication processor 102 also conducts wireless communication processing when connecting to the Internet. Processors such as the communication processor 102 and the audio processor 103 exchange control data with the controller 110 via a control line CL, while also transmitting data via a data line DL.

The mobile phone client device 100 is also provided with a display unit 106 and a touch panel 107a, as discussed earlier. Display by the display unit 106 is controlled by the controller 110. Besides captured images obtained by an imaging unit discussed later and virtual objects, information obtained as part of the execution of various functions provided in the mobile phone client device 100 is displayed on the display unit 106.

The touch panel 107a is configured as a single operable unit 107, together with operable keys 107c (see FIG. 1) provided on the case of the mobile phone client device 100. Control of the touch panel 107a is conducted by a touch panel controller 107b. In the case where the user performs an input operation with respect to the touch panel 107a, the touch panel controller 107b generates an instruction signal (detection signal) according to the content of the input operation, and supplies it to the controller 110 and an AR display processor 116 discussed later.

The mobile phone client device 100 is also provided with an imaging unit 108, a storage unit 109, and a controller 110. The imaging unit 108 is provided with an image sensor consisting of a CCD (Charge-Coupled Device) or CMOS (Complementary Metal-Oxide-Semiconductor), for example. The imaging unit 108 generates an image signal by photoelectrically converting subject light focused onto its photosensor surface via a lens not illustrated. Image signal generation is conducted at a given frame rate such as 30 fps (frames per second), for example, with a generated image signal being displayed by the display unit 106 as a captured image. Additionally, an image signal generated by the imaging unit 108 is also supplied to an image recognition unit 113 discussed later.

As illustrated in FIG. 1, in the case where a user performs an action of holding up a mobile phone client device 100 in the direction of a marker image Pm, the marker image Pm appears in the lens of a camera disposed on the back of the case of the mobile phone client device 100. Then, an image signal having the marker image Pm as its subject is generated by the imaging unit 108 and transmitted to the display unit 106 and the image recognition unit 113. In such cases, information on the marker image Pm will also be included in captured images obtained by the imaging unit 108.

The storage unit 109 comprises ROM (Read-Only Memory) and RAM (Random Access Memory), and stores various application programs as well as data required when executing such application programs. Also stored is various data such as image files and video files, the marker image Pm, and various parameters transmitted from other client devices which are required to construct an augmented reality system. The various parameters required to construct an augmented reality system include information on the positions and orientations of other client devices in the real-world coordinate system, and information on the positions and orientations of data to be drawn as virtual objects in the real-world coordinate system.

The controller 110 comprises a microprocessor, and conducts communication control, audio processing and its control, image processing and its control, as well as various other signal processing and control of respective units. Also, in the present embodiment, the controller 110 applies control causing a virtual object display processor discussed later to conduct a virtual object display process, and control that transmits information on the device's own position and orientation in a real-world coordinate system constructed by a spatial recognition unit discussed later to other client devices. Such control is applied at given timings, such as when the touch panel 107a is touched by the user, for example. The transmission of such information may be conducted every time a new frame of a captured image is generated by the imaging unit 108, for example. Details of such processes will be discussed later.

The mobile phone client device 100 is also provided with a wireless communication processor 111 connected to an antenna 112, an image recognition unit 113, a spatial recognition unit 114, a graphic object determining unit 115, and an AR display processor 116 that acts as a virtual object display processor. The wireless communication processor 111 wirelessly communicates with nearby devices via the antenna 101 according to a protocol based on a given communication standard. In the present embodiment, the wireless communication processor 111 is taken to conduct wireless communication compliant with a standard such as the earlier-mentioned Bluetooth or Wi-Fi Direct, for example. Furthermore, in some cases the mobile phone client device 100 also connects to the Internet with wireless communication by the wireless communication processor 111.

The image recognition unit 113 takes captured images input at a given frame rate from the imaging unit 108 as input images, and from them detects a marker image Pm. Information on the marker image Pm is registered in advance. Such information may be the lengths of the respective sides of an image capturing the marker image from a perpendicular direction at a given distance, and features, for example. However, it may also be configured such that information on some object existing in a real space is registered as the marker image Pm, with the object being used as a marker.

The image recognition unit 113 detects a marker image Pm with a technique like the following. First, a captured image obtained by the imaging unit 108 is binarized using a given, predetermined threshold value, and connected regions with sequences of identical values are extracted. Then, for each connected region a point at one end is found, and the contour of the region is extracted by taking that point as the origin. Subsequently, the lines of the extracted contour (outline) are subjected to a broken line approximation consisting of joined line segments, and the connected region resulting from the approximation is detected as a candidate for the marker image Pm. Pattern matching against a registered marker image is executed for the regions detected as candidates for the marker image Pm, and the connected region determined to have the highest similarity to a registered marker image from the pattern matching results is recognized as the marker image Pm.

Figure 3:
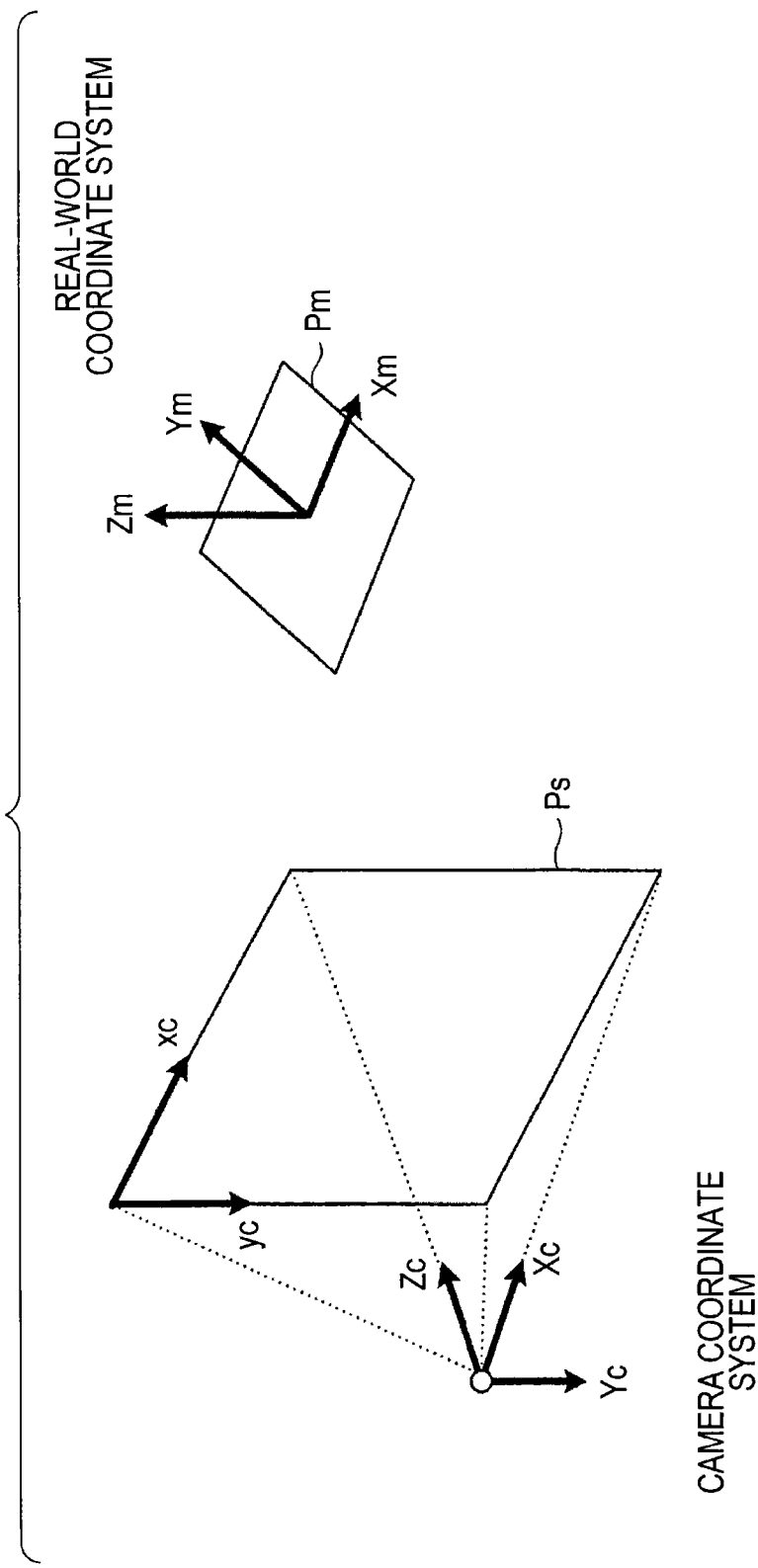
FIG. 3 is an explanatory diagram according to an embodiment of the present disclosure, illustrating an exemplary association between a marker image and device information.

In the case where the marker image Pm is detected by the image recognition unit 113, the spatial recognition unit 114 estimates, from captured image data supplied from the imaging unit 108, the spatial positional relationship of the imaging unit 108 with respect to the marker image Pm in real space. The spatial positional relationship means positions (coordinates) and directions (orientations) in real space. Specifically, as illustrated in FIG. 3, the spatial recognition unit 114 generates a spatial coordinate transform matrix for converting a real-world coordinate system (Xm, Ym, Zm) based on the marker image Pm in real space into a camera coordinate system (Xc, Yc, Zc) based on the imaging unit 108 in real space. The origin of the camera coordinate system is set at the focal position of the imaging unit 108, for example, with the Z axis (Zc) taken to be the direction perpendicular to the image plane Ps upon which a captured image is projected, the X axis (Xc) taken to be the direction parallel to the x axis (xc) of the image plane Ps, and the Y axis (Yc) taken to be the direction parallel to the y axis (yc).

In the present embodiment, a real-world coordinate system is generated on the basis of information stated in a marker image—real-world coordinate system correspondence table 114a. In the marker image—real-world coordinate system correspondence table 114a, information on a marker image Pm as discussed above is registered in association with parameters for generating coordinates in a real-world coordinate system. For example, associated with the marker image Pm illustrated in FIG. 1 is a parameter that sets the origin of the real-world coordinate system is in the center of the image, as well as parameters that take Xm, Ym, and Zm to be respective directions centered about the origin in an image capturing the marker image Pm from a perpendicular direction at a given distance. Such information stated in the marker image—real-world coordinate system correspondence table 114a is shared among mobile phone client devices 100 that transmit and receive data.

Taking Xm as an example, there may be registered information that takes the positive direction of the X axis to be the right side of the direction centered about the origin and parallel to the top and bottom edges of the marker image Pm, for example. However, the origin position is not strictly required to be set at the center of the marker image Pm and may also be set at another position, such as a position separated from the center of the marker image Pm by a given distance. The set directions for the X axis and the Y axis also need not be parallel to respective edges of the marker image Pm, and the diagonal directions of the marker image Pm may be respectively set as the X axis and the Y axis, for example. The origin position and the direction set for each axis in the real-world coordinate system may be made to differ for each image registered as a marker image Pm.

In this way, the spatial recognition unit 114 constructs a real-world coordinate system on the basis of information stated in the marker image—real-world coordinate system correspondence table 114a. Thus, a real-world coordinate system uniquely determined according to features of a marker image Pm is constructed, regardless of the angle from which the marker image Pm is captured. In other words, a shared real-world coordinate system is constructed in respective mobile phone client devices 100 existing at different positions in real space.

Additionally, the spatial recognition unit 114 computes the device's own position and orientation in the real-world coordinate system. More specifically, the spatial recognition unit 114 computes the position (coordinates) in a real-world coordinate system with an origin at the device's own camera (imaging unit 108), and the tilt (orientation) in the real-world coordinate system of the device's own camera, which is expressed in virtual space by a cube, for example.

On the basis of the number and position of touches made by a user with respect to the touch panel 107a, the graphic object determining unit 115 determines which data to select as a virtual object Ar from among data existing in the storage unit 109 or on the network, as well as where to set its placement position in the real-world coordinate system. Associations between phenomena given as triggers causing execution of a process that extracts data as a graphic object, data to be extracted as graphic objects, and positions where extracted graphic objects are to be displayed as virtual objects Ar are described in "a draw trigger—graphic object—draw position correspondence table 115a".

In the present embodiment, user touch operation detections by the touch panel 107a are stated in the "Draw trigger" field of the draw trigger—graphic object—draw position correspondence table 115a. Also, associations between numbers of touches and data storage locations, which are used to change the data to select according to the number of touches, are stated in the "Graphic object" field. Settings for placing data extracted as a graphic object at a position centered about a touch position detected by the touch panel 107a, and in an orientation facing forward with respect to the screen of the display unit 106, are stated in the "Draw position" field.

In other words, by overwriting the content registered in the "Draw trigger", "Graphic object", and "Draw position" fields with arbitrary values (settings), it becomes possible to set the timing at which to draw a graphic object as a virtual object Ar, the content of the graphic object itself, and the position at which to draw the graphic object as desired.

The AR (Augmented Reality) display processor 116 generates a virtual object Ar to place in the camera coordinate system from data selected by the graphic object determining unit 115 and the spatial coordinate transform matrix generated by the spatial recognition unit 114. Then, the virtual object Ar is composited with a captured image from the imaging unit 108 capturing real space, and displayed on the screen of the display unit 106. The virtual object Ar is placed at a position determined by the graphic object determining unit 115.

Figure 4:
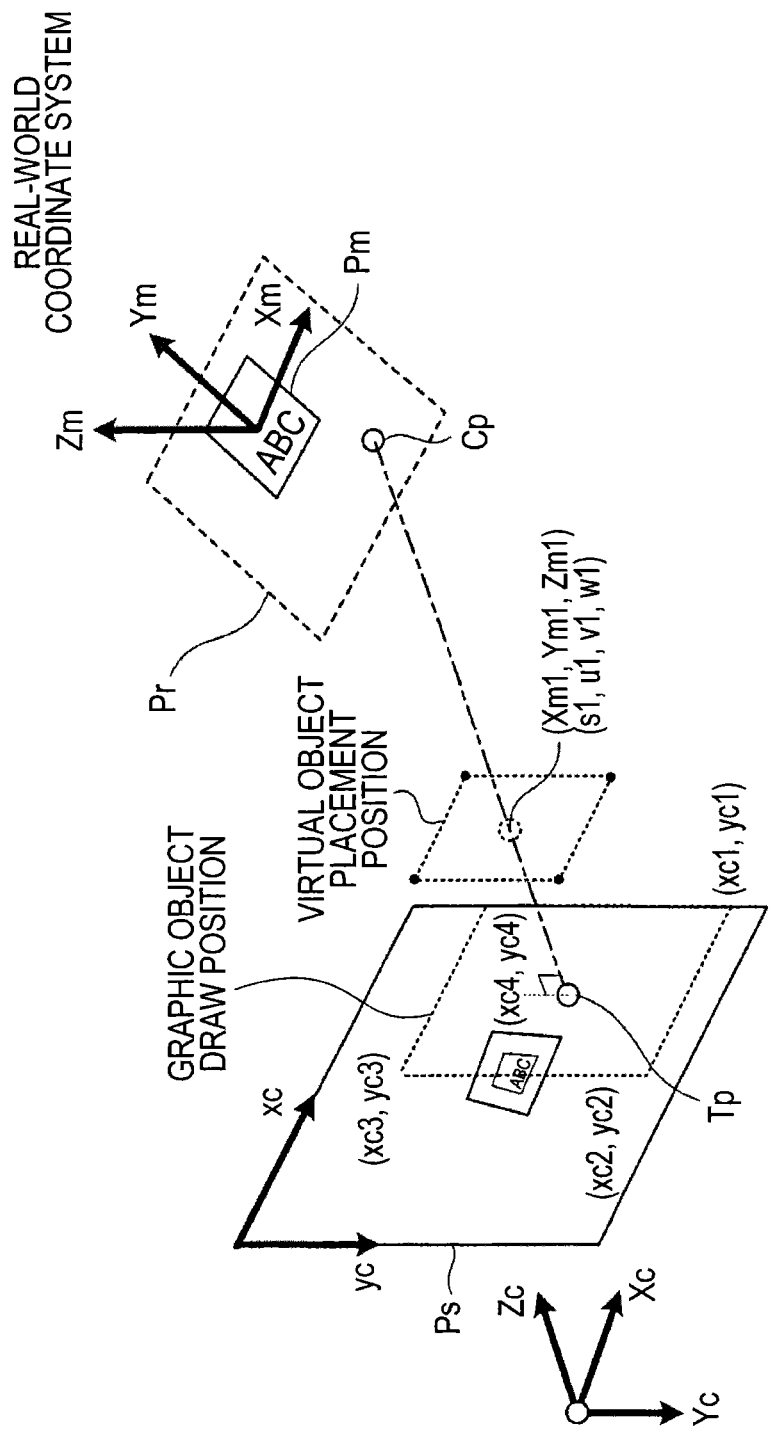
FIG. 4 is an explanatory diagram according to an embodiment of the present disclosure, illustrating an exemplary association between a position touched by a user and the placement positions of a virtual object in a virtual space and a display screen.

FIG. 4 is a diagram illustrating an exemplary association between a position touched by a user and the placement positions of a virtual object Ar in a virtual space and a display screen. As an example, it is assumed that a given position on the touch panel 107a disposed in the same plane as the image plane Ps has been touched by a user. In this case, the AR display processor 116 computes the direction orthogonal to the image plane Ps at the touch position Tp, and additionally computes the point of intersection Cp where a line representing the orthogonal direction intersects a marker image recognition plane Pr in which a marker image Pm exists.

Then, the virtual object Ar is placed at a given position on the line joining the touch position Tp and the point of intersection Cp, and in an orientation facing the display unit 106, or in other words, facing forward with respect to the image plane Ps. The placement position of the virtual object Ar is indicated in FIG. 4 as the "virtual object placement position".

The placement position of the virtual object Ar is expressed by (Xm1, Ym1, Zm1), as illustrated in FIG. 4.

The placement position of the virtual object Ar in the depth (Z axis, Zc) direction is set at a position separated from the image plane Ps by a given distance while in the state where the display spot of the virtual object Ar has been selected by a touch operation, for example. In other words, the virtual object Ar is moved in conjunction with the position of the mobile phone client device 100. Additionally, its position is fixed once the selection made by the touch operation is canceled (the finger is released). Thus, the virtual object Ar will stay at a fixed position without changing, even in cases where the position of the mobile phone client device 100 moves. However, this method of determining the placement position of a virtual object Ar in the Zc direction is an example, and determination by another technique may also be configured.

Also, the orientation of the virtual object Ar is expressed by (s1, u1, v1, w1). Although the orientation of the virtual object Ar is ordinarily set to an orientation facing forward with respect to the image plane Ps, its orientation may also be varied according to the Z axis (Zm) value of the bottom edge portion of the virtual object Ar in the real-world coordinate system. For example, the orientation of the virtual object Ar may also be set so as to be pasted onto the marker image recognition plane Pr in cases where the Zm value of the bottom edge portion of the virtual object Ar has become less than or equal to the Zm origin of the marker image recognition plane Pr as a result of moving the position of the mobile phone client device 100. In such cases, the virtual object Ar will be as though stuck to the plane in which the marker image Pm exists.

Additionally, in cases where the drawn virtual object Ar is selected and moved by a touch operation on the touch panel 107a, the AR display processor 116 moves the virtual object Ar following the trail of that touch operation. Furthermore, in cases where information on data to be displayed as one or more virtual objects Ar as well as position and orientation information for those virtual objects Ar in the real-world coordinate system is transmitted from another client device, placement positions and orientations for those virtual objects Ar in the real-world coordinate system are determined on the basis of that information and information on any virtual objects Ar being displayed by the current device.

Then, processes like the following, for example, are conducted on the basis of the positions and orientations of virtual objects Ar being drawn by other client devices and information on the positions and orientations of virtual objects Ar being drawn by the current device.

In cases where the position in virtual space of a virtual object Ar transmitted from another client device overlaps with the position of a virtual object Ar being displayed by the current device, an image representing "a collision", for example, is displayed as an effect at that spot.

At the display position of another client device in a captured image from the imaging unit 108, a characteristic virtual object Ar representing that client device is displayed superimposed.

The process causing a characteristic virtual object Ar representing another client device to be displayed at the display position of that client device in a captured image is conducted on the basis of position and orientation information for that device in the real-world coordinate system transmitted from the other client device, as well as source data for the virtual object Ar and its position and orientation information. In other words, a virtual object Ar generated on the basis of data transmitted from another client device is placed in the real-world coordinate system at the position and orientation of that device, which were transmitted from the other client device. However, data expressing a characteristic virtual object Ar representing another client device may also be readied in one's own device. In this case, it is configured such that information indicating the client device size is transmitted from another client device in addition to the position and orientation information for that client device in the real-world coordinate system. Then, the information transmitted from the other client device is used to display a characteristic virtual object Ar representing that client device, superimposed at the position of that client device in the real-world coordinate system and in the same orientation as that client device.

Additionally, the AR display processor 116 computes a placement position for a virtual object Ar in the image plane Ps {(xc1, yc1), (xc2, yc2), (xc3, yc3), (xc4, yc4)}, on the basis of position and orientation information in the real-world coordinate system for the virtual object Ar determined by a technique like that discussed above. Then, a virtual object Ar1 is displayed at the computed position in the image plane Ps. In FIG. 4, the placement position of the virtual object Ar in the image plane Ps is indicated as the "graphic object draw position".

[3. Exemplary Information Processing by Mobile Phone Client Device]

Next, exemplary information processing conducted by the information processing apparatus 100 will be described with reference to the flowchart in FIG. 5. First, when a user operation activating a virtual object drawing function is received via the touch panel 107a or the operable keys 107c (step S1), the imaging unit 108 is activated on the basis of control by the controller 110 (see FIG. 2) (step S2).

Figure 6:
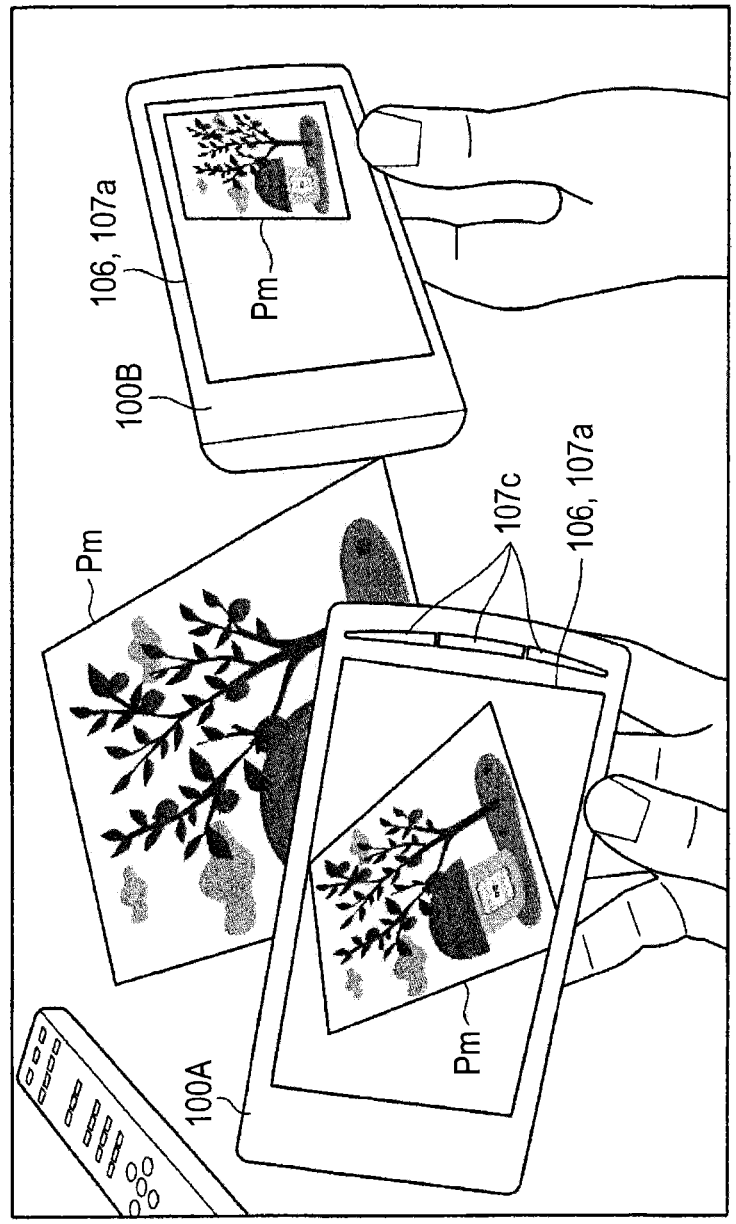
FIG. 6 is an explanatory diagram according to an embodiment of the present disclosure, illustrating an exemplary state in which respective mobile phone client devices have recognized a marker image.

Subsequently, a captured image from the imaging unit 108 is displayed on the screen of the display unit 106 (step S3), and it is determined by the image recognition unit 113 whether or not a marker image Pm is detected from the captured image (step S4). The process waits for input of the next frame of captured image from the imaging unit 108 and the determination in step S4 is repeated until a marker image Pm is detected. "Yes" is selected in step S4 if in a state where a marker image Pm appears on the screens of the respective display units 106 in the mobile phone client device 100A and the mobile phone client device 100B as illustrated in FIG. 6.

Figure 7:
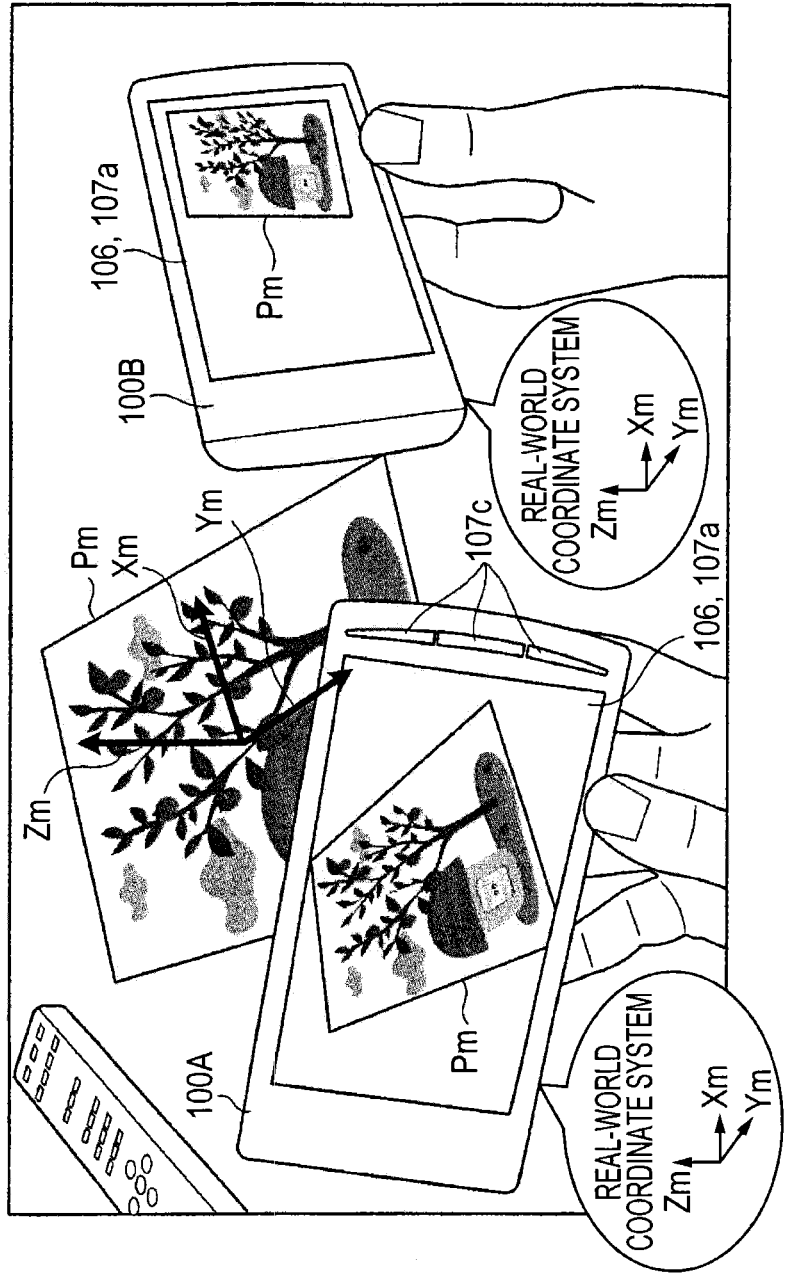
FIG. 7 is an explanatory diagram according to an embodiment of the present disclosure, illustrating an example of how the same real-world coordinate system is constructed in respective mobile phone client devices.

In the case where a marker image Pm is detected, the marker image—real-world coordinate system correspondence table 114a is referenced by the spatial recognition unit 114, and information on the marker image Pm detected in step S4 is used to construct a real-world coordinate system (step S5). FIG. 7 is a diagram illustrating how a shared real-world coordinate system is constructed in the mobile phone client device 100A and the mobile phone client device 100B.

Figure 5:
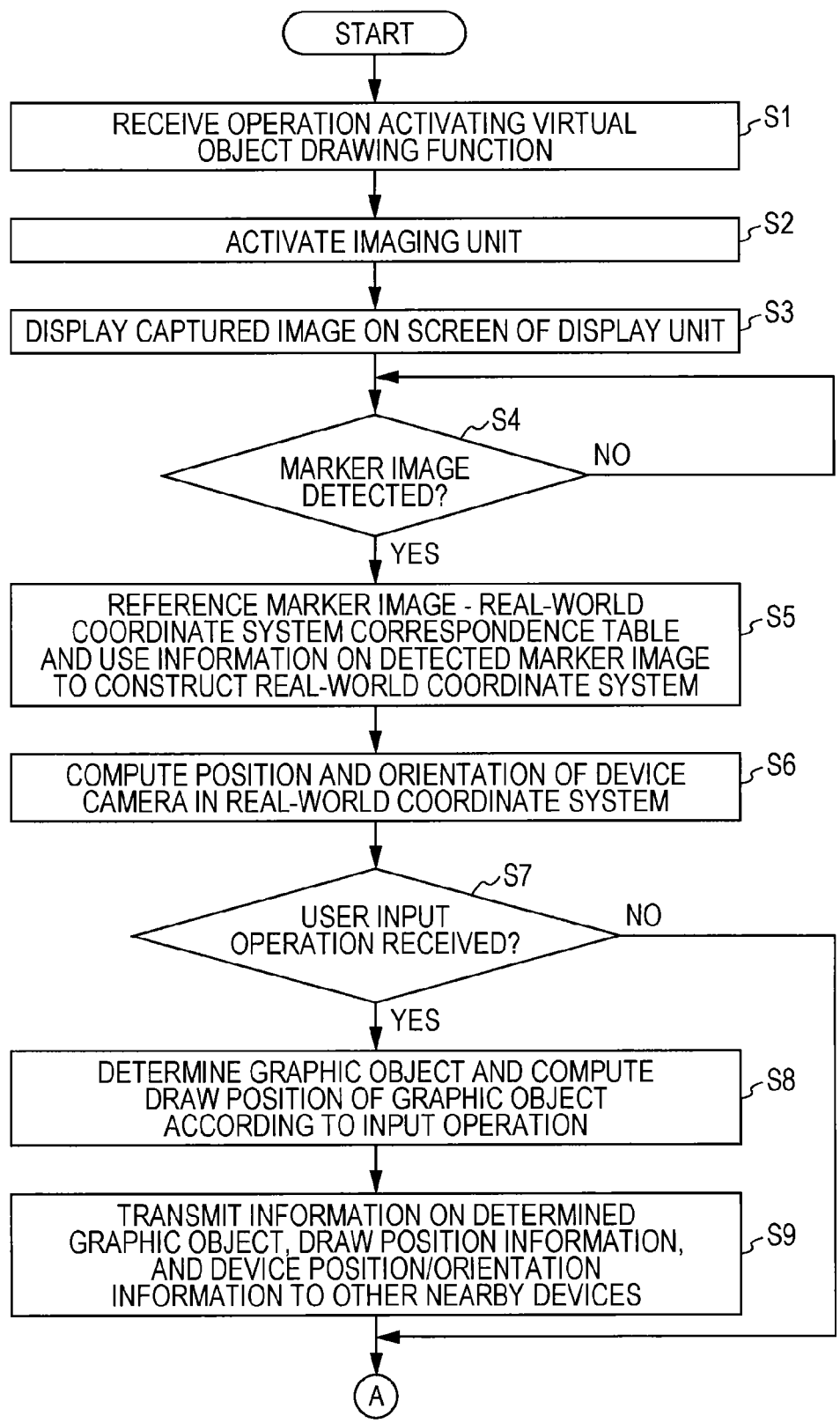
FIG. 5 is a flowchart according to an embodiment of the present disclosure, illustrating exemplary information processing by a mobile phone client device.

The description will now return to the flowchart in FIG. 5 and proceed. Once a real-world coordinate system is constructed, the device's own position and orientation in the real-world coordinate system are computed by the spatial recognition unit 114 (step S6). Then, it is determined whether or not the user has performed an input operation (step S7). In the present embodiment, the touch panel controller 107b determines whether or not a touch operation has been input with respect to the touch panel 107a. The process proceeds to the connector A in the case where a user input operation is not detected.

In the case where an input operation is performed, the graphic object determining unit 115 determines a graphic object and computes the draw position of the graphic object according to the content of the input operation (step S8).

Specifically, processing is conducted such that the data (graphic object) to select is changed according to the number of touch operations which have been performed, with the selected data being placed at the position where the touch operations are performed, as discussed earlier.

Figure 8A:
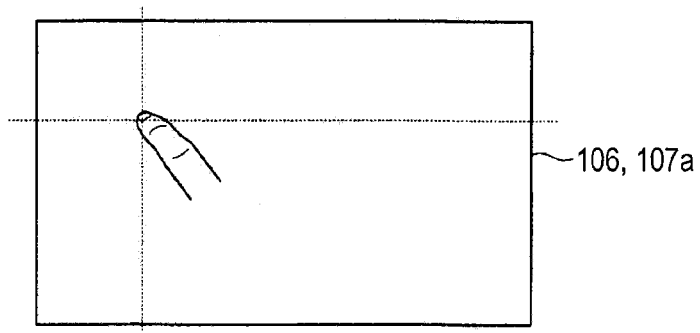
FIGS. 8A-8D are explanatory diagrams according to an embodiment of the present disclosure, illustrating an example of how graphic objects drawn as virtual objects are determined according to the number and position of touches made by a user.
Figure 8B:
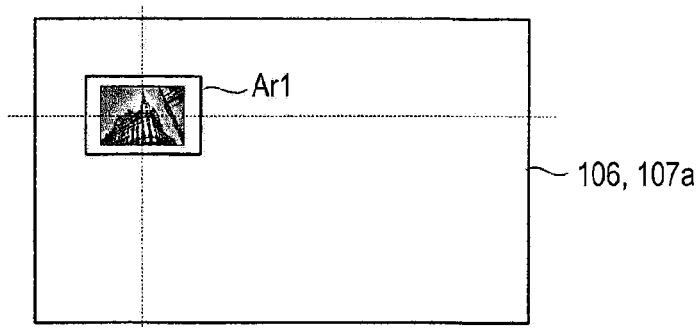
Figure 8C:
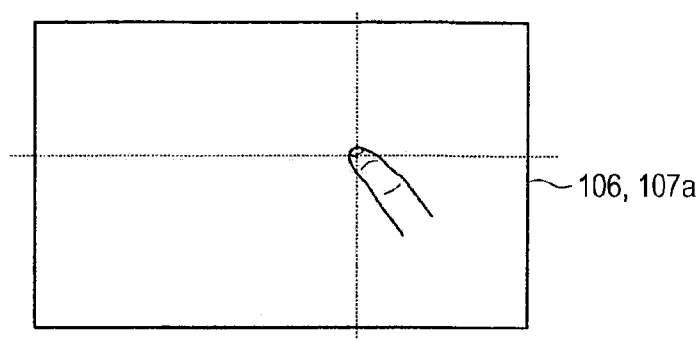
Figure 8D:
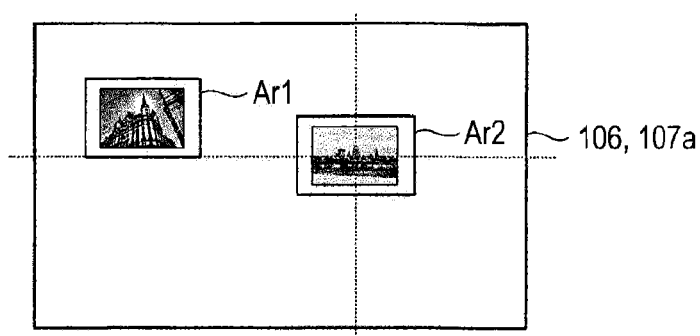

FIGS. 8A-8D illustrate exemplary processing in which graphic objects are selected by the graphic object determining unit 115 and displayed on the display unit 106. In the case where a user performs a first touch operation as illustrated in FIG. 8A, an image depicting a close-up of a building is selected as a virtual object Ar1, with its placement position determined to be the touch position where the touch operation was performed, as illustrated in FIG. 8B. Also, in the case where a user performed a second touch operation as illustrated in FIG. 8C, image data depicting a landscape that includes a building is selected, the image being different from the image selected during the first touch operation, as illustrated in FIG. 8D. In addition, the position illustrated in FIG. 8C where the second touch operation was performed is set as the position where the selected image data is drawn as a virtual object Ar2.

The description will now return to the flowchart in FIG. 5 and proceed. In step S8, the selection of a graphic object to draw as a virtual object Ar and its display position are determined. Subsequently, the controller 110 applies control to transmit information on the graphic object selected as the virtual object Ar, information on its position and orientation in the real-world coordinate system, and information on the device's own position and orientation in the real-world coordinate system to other nearby client devices (step S9), and the process proceeds to the connector A.

Figure 9:
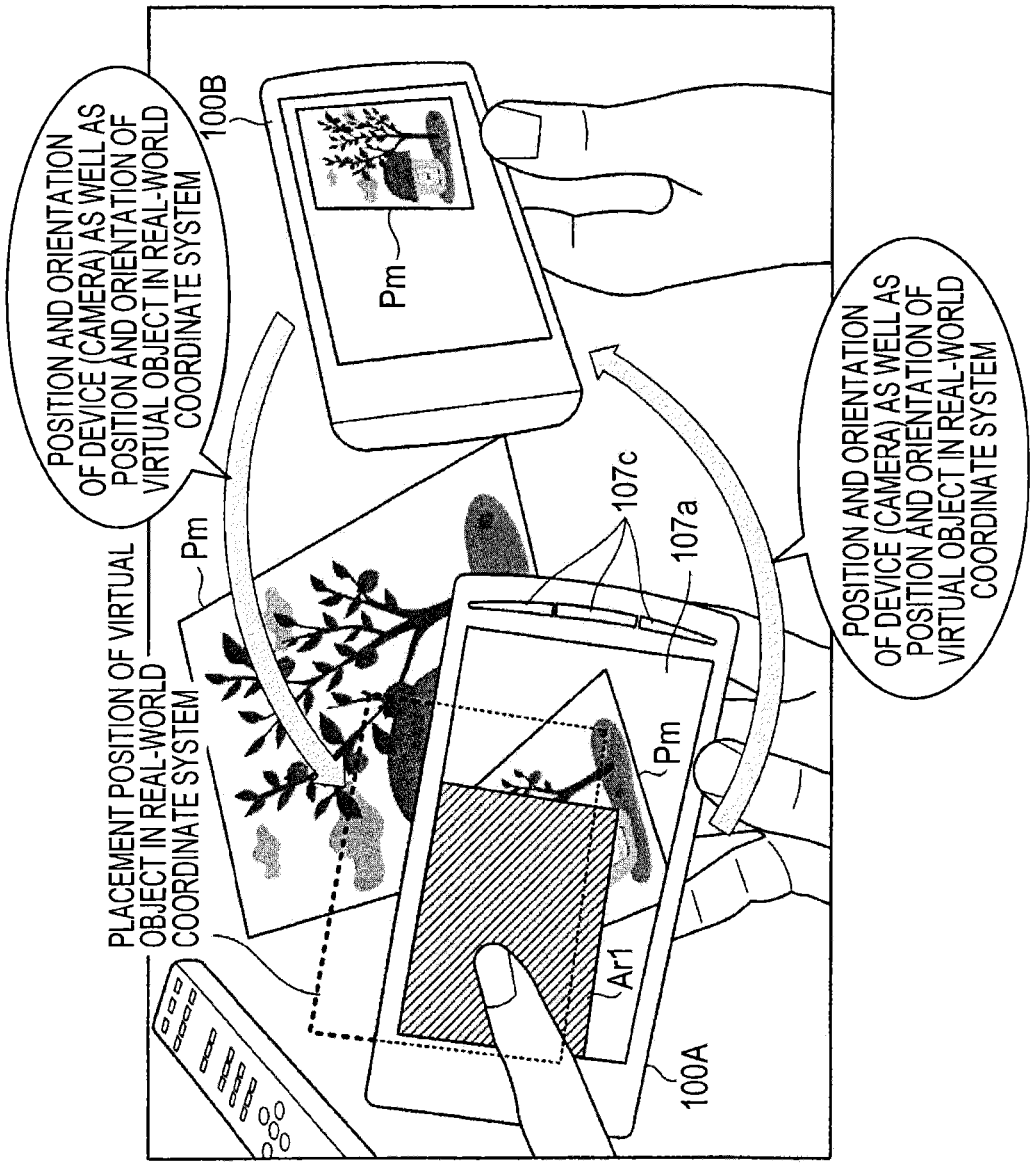
FIG. 9 is an explanatory diagram according to an embodiment of the present disclosure, illustrating exemplary information exchanged between respective mobile phone client devices.

FIG. 9 is a diagram illustrating a depiction of information on a graphic object selected as a virtual object Ar, information on its position and orientation in a real-world coordinate system, and information on a device's own position and orientation in the real-world coordinate system being transmitted and received between a mobile phone client device 100A and a mobile phone client device 100B.

Figure 10:
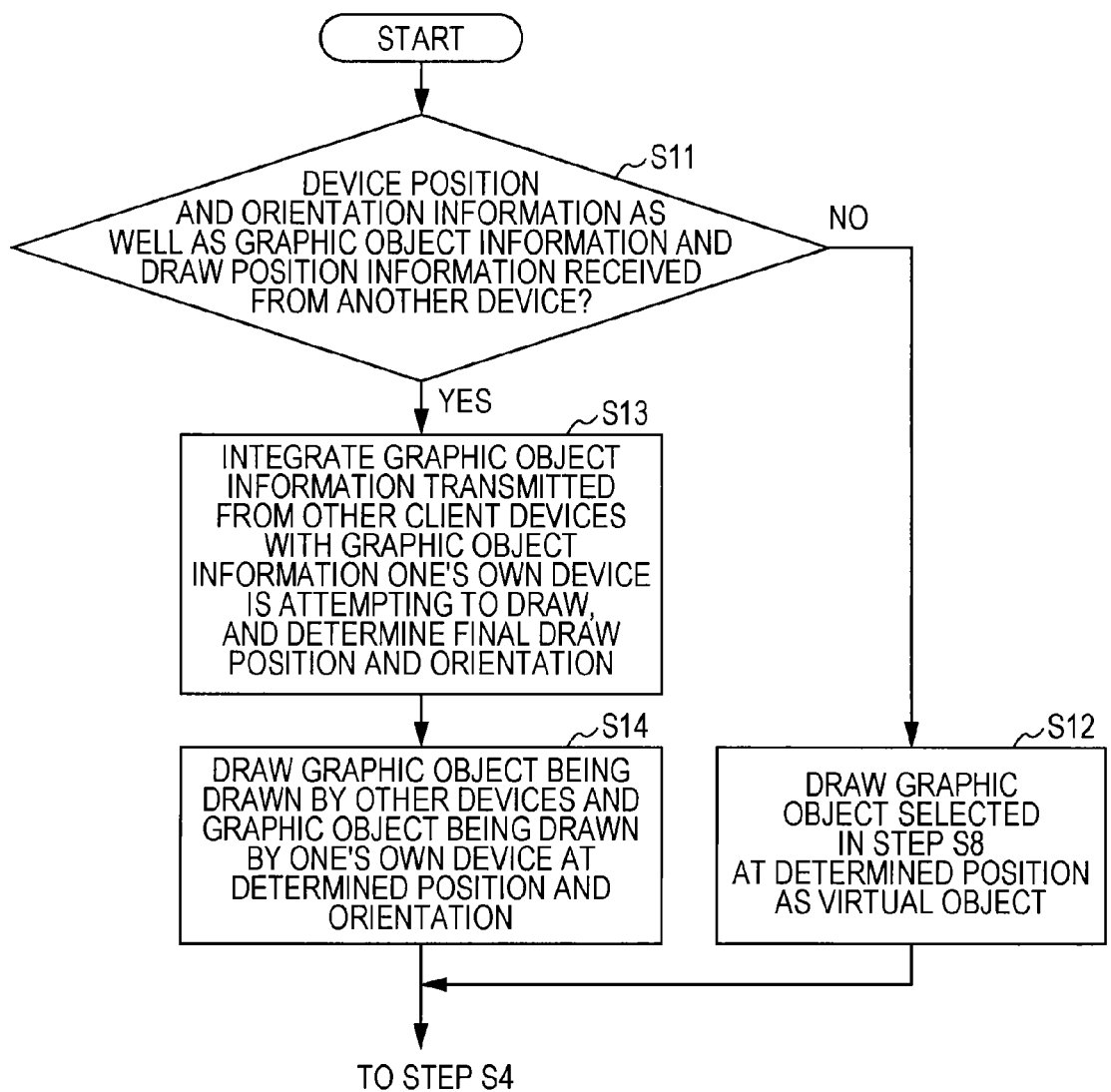
FIG. 10 is a flowchart according to an embodiment of the present disclosure, illustrating exemplary information processing by a mobile phone client device.

Next, the process from the connector A illustrated in FIG. 5 will be described with reference to the flowchart in FIG. 10. First, it is determined if the wireless communication processor 111 has received information on the position and orientation of another device in a real-world coordinate system, graphic object information, and graphic object position and orientation information transmitted from another client device (step S11). In the case of not receiving such information, processing is conducted to draw the graphic object that was selected in step S8 of FIG. 5 at its determined position as a virtual object Ar (step S12).

In the case of receiving such information, the AR display processor 116 integrates the graphic object transmitted from the other client device and the graphic object one's own device is attempting to draw, and determines a final draw position (step S13). Then, the graphic object transmitted from the other client device and the graphic object being drawn by one's own device are drawn at the position and orientation determined in step S13 (step S14). After this processing is conducted, the process returns to step S4 of FIG. 5 and the process continues.

Figure 11:
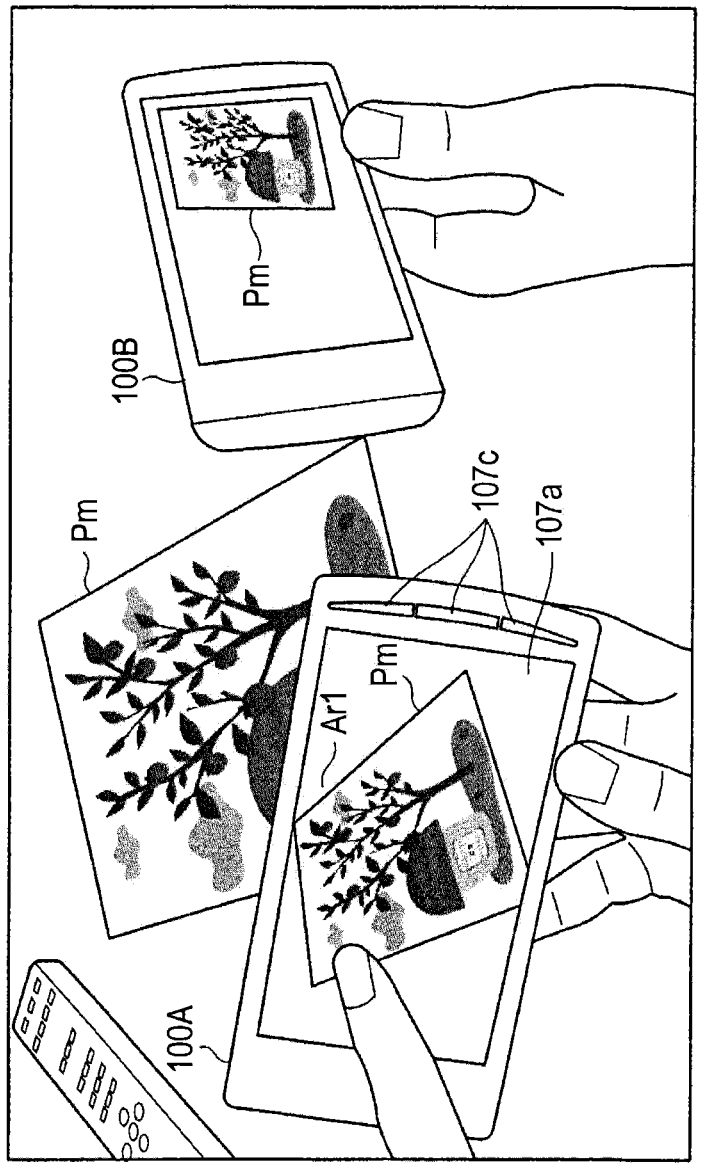
FIG. 11 is an explanatory diagram according to an embodiment of the present disclosure, illustrating an exemplary state in which the screen of a mobile phone client device has been touched by a user.

Subsequently, exemplary displays of virtual objects Ar according to user input operations will be described with reference to FIGS. 11 to 17. In FIGS. 11 to 17, like signs are given to parts that correspond to FIGS. 1 and 2, and duplicate description will be reduced or omitted. FIG. 11 illustrates a state in which a marker image Pm appears on the screen of the respective display units 106 of a mobile phone client device 100A and a mobile phone client device 100B, and in which the user of the mobile phone client device 100A has touched an arbitrary position on the screen of the display unit 106 of the mobile phone client device 100A.

Figure 12:
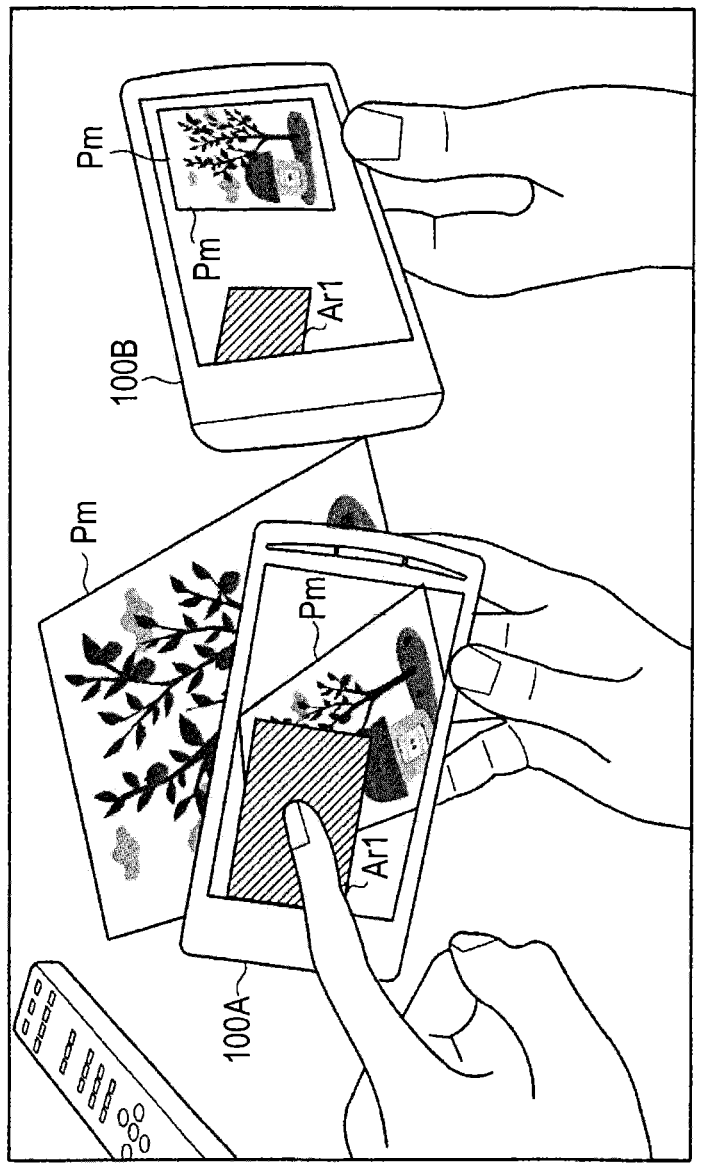
FIG. 12 is an explanatory diagram according to an embodiment of the present disclosure, illustrating an exemplary state in which a virtual object is drawn at a position touched by a user.

Due to such an operation being input, a virtual object Ar1 is displayed at the touch position touched by the user, as illustrated in FIG. 12. Information on the position and orientation of the virtual object Ar1 in the real-world coordinate system is transmitted to the mobile phone client device 100B, and the virtual object Ar1 is similarly drawn by the AR display processor 116 of the mobile phone client device 100B. In other words, even in the mobile phone client device 100B, the virtual object Ar1 is placed at the same position in the real-world coordinate system shared by the mobile phone client devices 100, with its orientation identical to the one being drawn in the mobile phone client device 100A. Thus, whereas the virtual object Ar1 is drawn as though stuck to the screen on the screen of the display unit 106 of the mobile phone client device 100A, on the mobile phone client device 100B the virtual object Ar1 is displayed in an orientation so as to face the direction in which mobile phone client device 100A exists.

Figure 13:
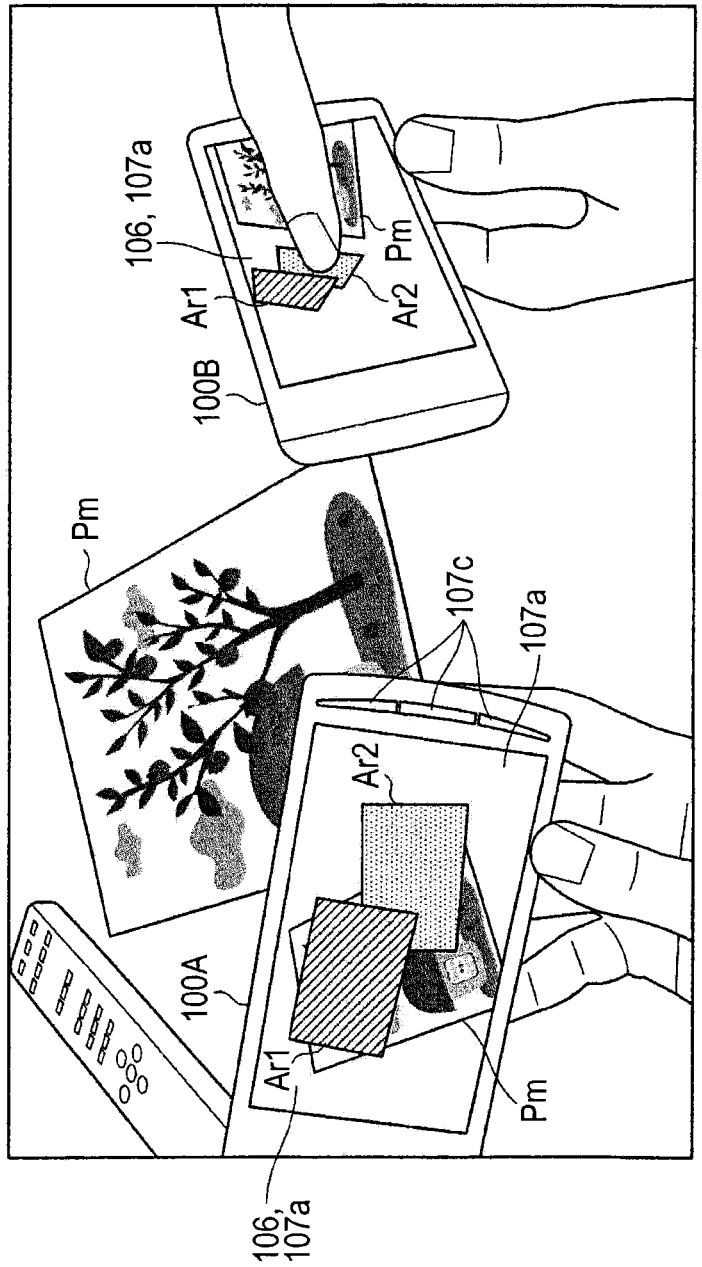
FIG. 13 is an explanatory diagram according to an embodiment of the present disclosure, illustrating exemplary displays in the case where a virtual object is moved by another user.
Figure 14:
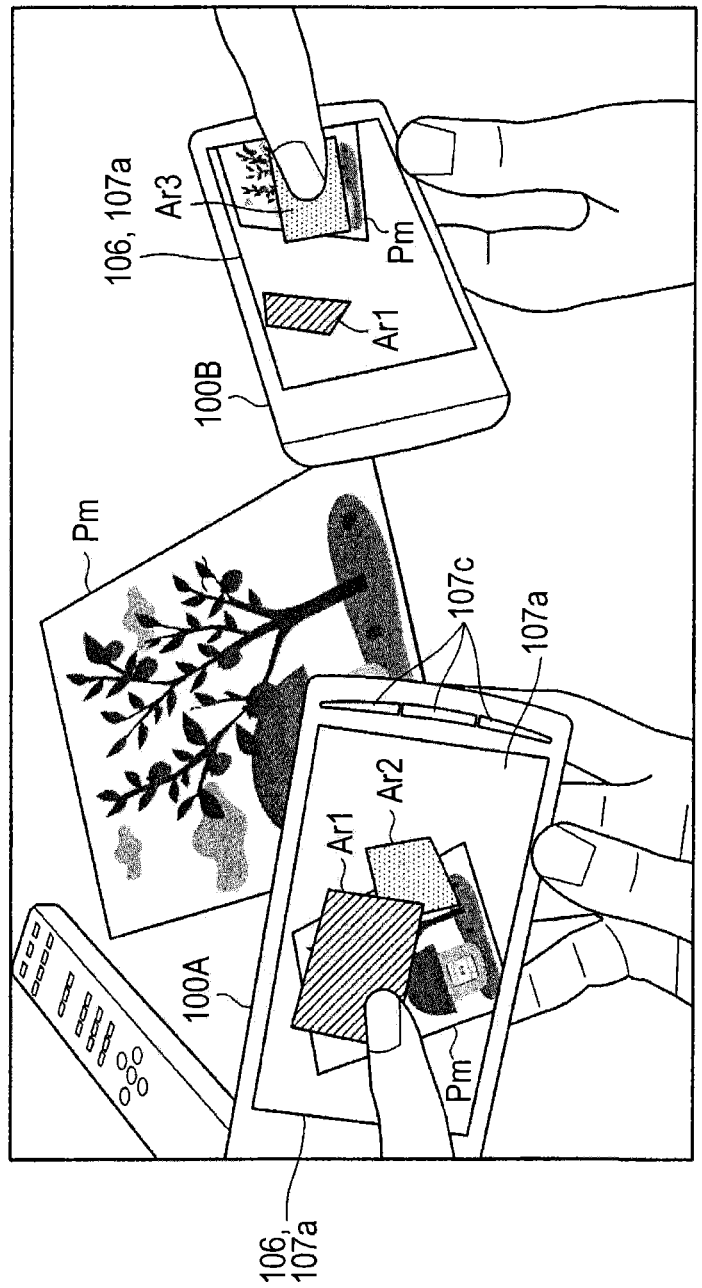
FIG. 14 is an explanatory diagram according to an embodiment of the present disclosure, illustrating an exemplary case in which the position and orientation of a virtual object changes as the virtual object is moved by another user.

FIG. 13 illustrates a state in which a virtual object Ar2 different from the virtual object Ar1 is displayed on-screen as a result of the user of the mobile phone client device 100A once again touching the touch panel 107a. FIG. 13 also illustrates the user of the mobile phone client device 100B touching the virtual object Ar2. Due to the touch and movement by the user of the mobile phone client device 100B, the display position of the virtual object Ar2 also moves to follow the touch position, as illustrated in FIG. 14.

Figure 15:
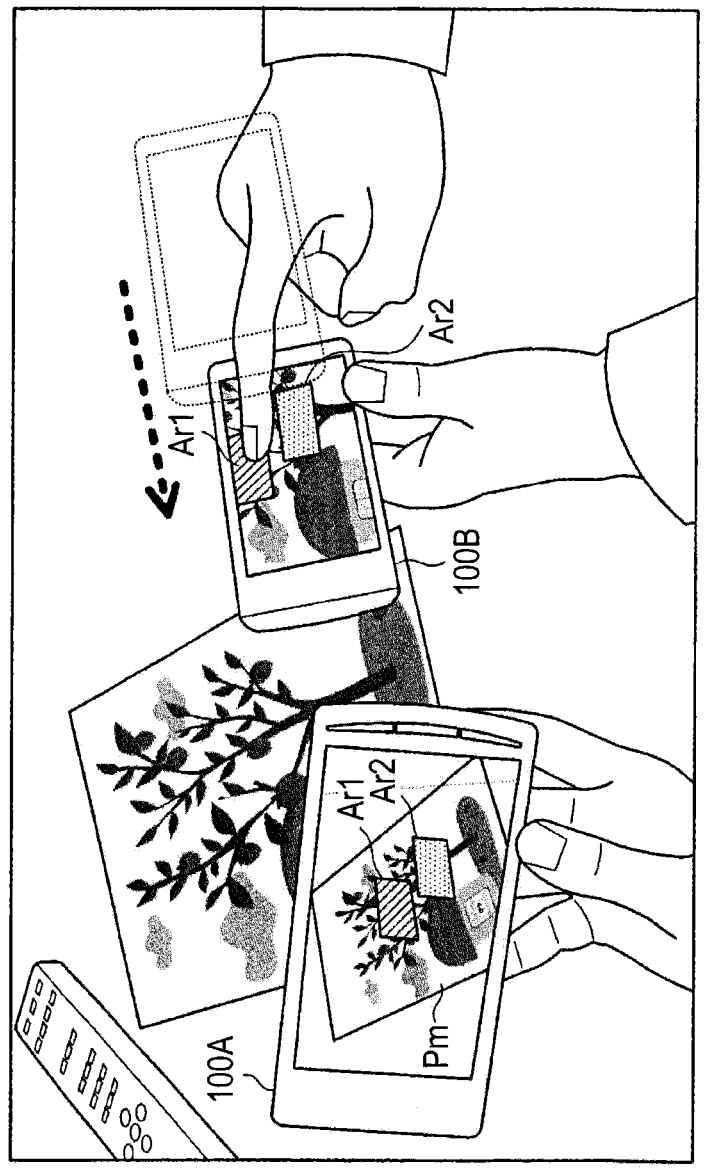
FIG. 15 is an explanatory diagram according to an embodiment of the present disclosure, illustrating exemplary change in the position and orientation of a virtual object in the case where a user moves a mobile phone client device closer to a marker image.
Figure 16:
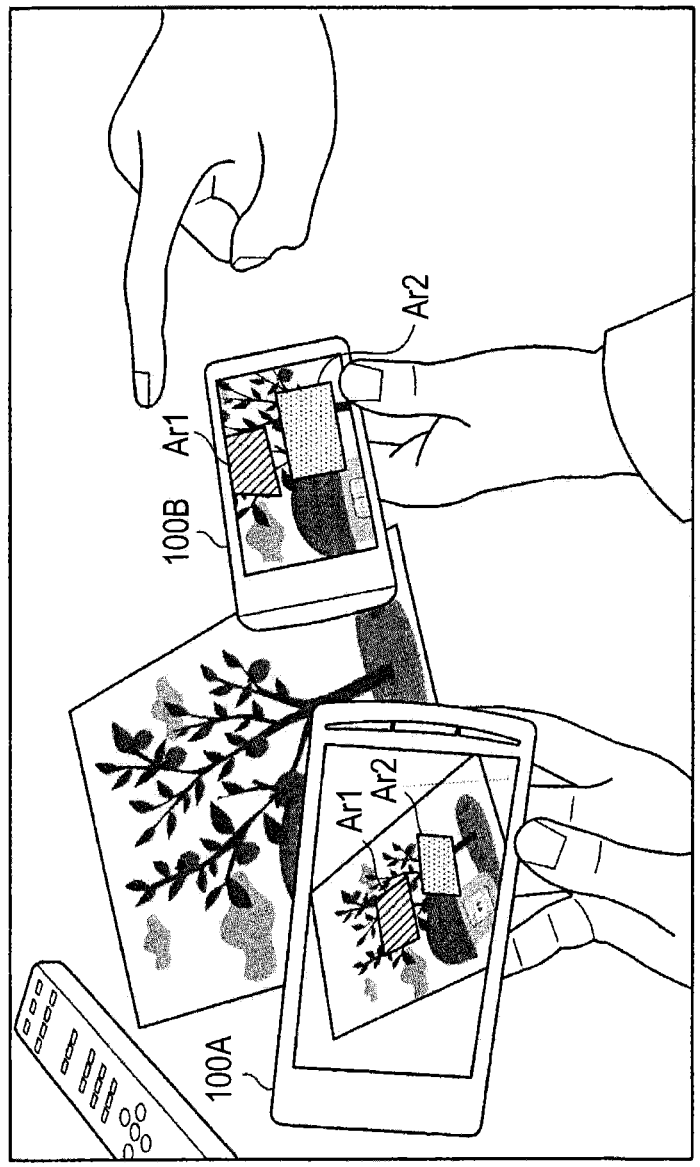
FIG. 16 is an explanatory diagram according to an embodiment of the present disclosure, illustrating exemplary change in the position and orientation of a virtual object in the case where a user moves a mobile phone client device closer to a marker image.

Additionally, as the user of the mobile phone client device 100B brings the mobile phone client device 100B nearer to the marker image Pm while in a state of touching the virtual object Ar1, as illustrated in FIG. 15, the virtual object Ar1 sticks to the plane in which the marker image Pm exists, as illustrated in FIG. 16. This is because the orientation of the virtual object Ar1 is changed to an orientation parallel to the marker image recognition plane Pr, due to the Z axis (Zm) coordinate value of the virtual object Ar1 in the real-world coordinate system going below than the marker image recognition plane Pr, as discussed earlier with reference to FIG. 4. Also, since such changes in the position and orientation of the virtual object Ar1 are also transmitted to the mobile phone client device 100A, the virtual object Ar1 likewise sticks to the plane in which the marker image Pm exists in the mobile phone client device 100A as well.

Figure 17:
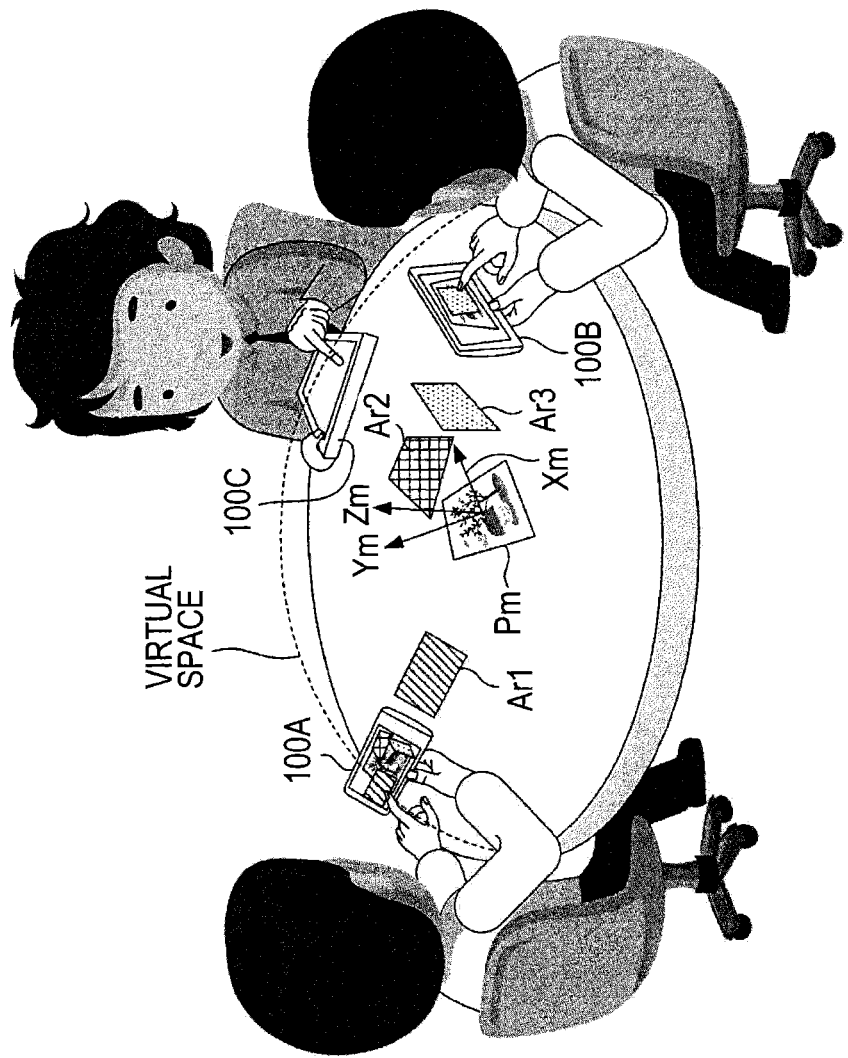
FIG. 17 is a schematic diagram according to an embodiment of the present disclosure, depicting a plurality of users sharing the same virtual space.

According to the above embodiment, in the case where an image of a marker image Pm is recognized in respective mobile phone client devices 100, a real-world coordinate system uniquely determined by features of the marker image Pm is constructed within the respective mobile phone client devices 100. FIG. 17 illustrates a depiction of virtual objects Ar1 to Ar3 placed in a virtual space expressed by a real-world coordinate system (Xm, Ym, Zm) constructed in this way.

Figure 2:
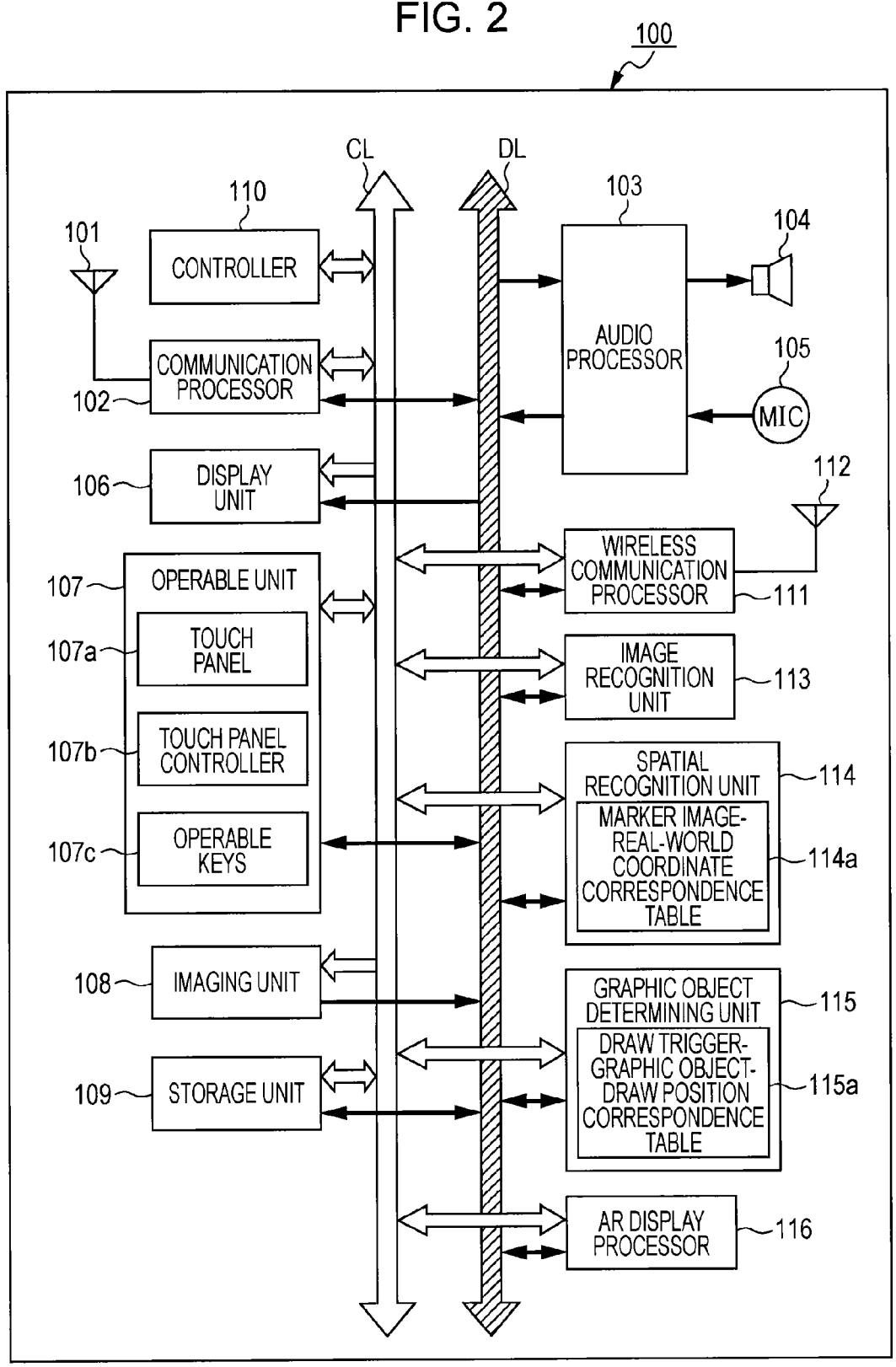
FIG. 2 is a block diagram according to an embodiment of the present disclosure, illustrating an exemplary configuration of a mobile phone client device.

According to the above embodiment, the spatial recognition unit 114 uses information on a marker image detected by the image recognition unit 113 to construct a real-world coordinate system on the basis of information stated in advance in the marker image—real-world coordinate system correspondence table 114a (see FIG. 2). Consequently, the real-world coordinate system constructed in each mobile phone client device 100 is the same, regardless of the angle from which the marker image Pm is captured.

Also, according to the above embodiment, information on the position and orientation of each mobile phone client device 100 in the real-world coordinate system is transmitted to other client devices at a given interval (synchronously with the capture frame rate, for example). Thus, the positions and orientations of other client devices in the real-world coordinate system can be constantly acquired in each mobile phone client device 100. In other words, it becomes possible to ascertain the positions and orientations of other client devices in the real-world coordinate system, even in cases where an image of another client device is not included in a captured image.

Also, according to the above embodiment, information on a graphic object being drawn as a virtual object Ar by one's own device, as well as information on its position and orientation in the real-world coordinate system, is transmitted to other client devices at a given interval. Additionally, the received graphic objects are placed at position as specified by each mobile phone client device 100 that has received the information. Thus, the placement positions and orientations of the virtual objects Ar1 to Ar3 in the virtual space will always be the same among the mobile phone client devices 100A to 100C, as illustrated in FIG. 17.

Also, according to the above embodiment, information on the position and orientation of each mobile phone client device 100 in the real-world coordinate system, as well as graphic object position and orientation information, is mutually transmitted and received at an interval such as every 1/30 seconds, for example. Consequently, since information on operations input by the user of another client device can be constantly ascertained as changes in the positions and orientations of graphic objects, it becomes possible to realize interactive information exchange in real-time.

Figure 18:
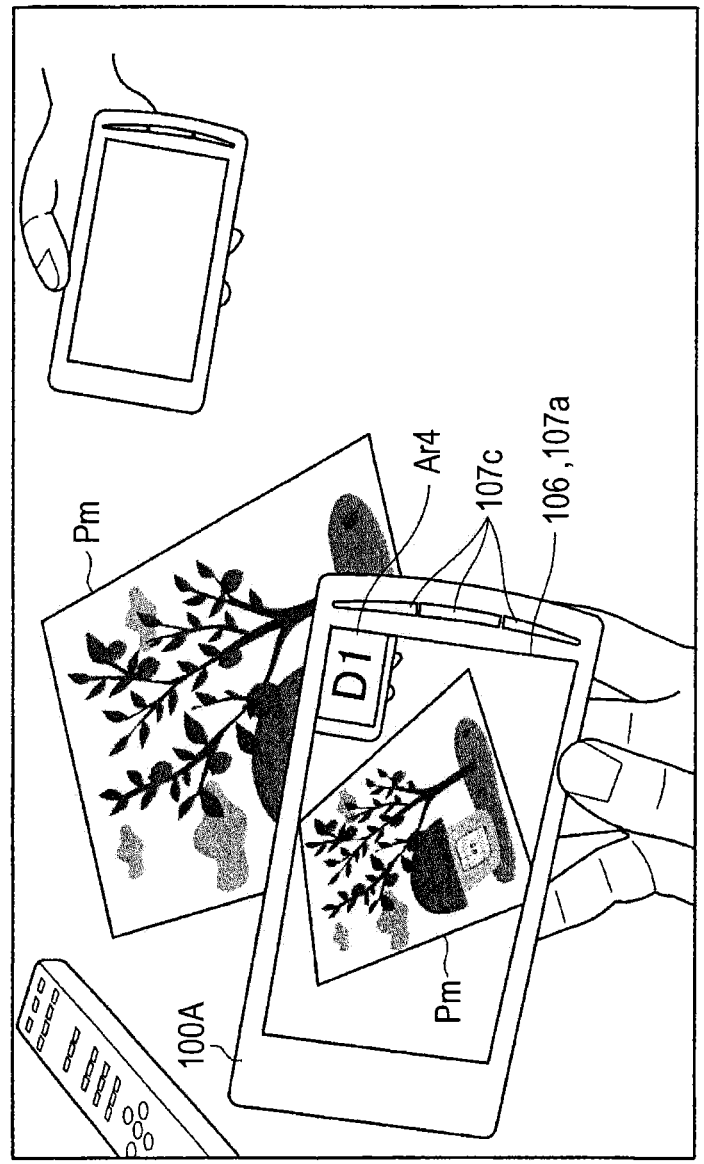
FIG. 18 is an explanatory diagram according to an embodiment of the present disclosure, illustrating an example of displaying a virtual object superimposed at a spot recognized as another mobile phone client device in a captured image.

Also, according to the above embodiment, information on the positions and orientations of other mobile phone client devices in the real-world coordinate system is transmitted by the other client devices at a given interval. For this reason, in the case where another client device appears in a captured image from the imaging unit 108, it can be determined on the basis of such received information that the appearing object is another client device. Thus, as illustrated in FIG. 18, it becomes possible to conduct processing such as superimposing a given virtual object Ar4 (a 2D object displayed as "D1" in FIG. 18) over an object recognized as another client device (a mobile phone client device 100C), with the given virtual object Ar4 indicating that the object is another client device.

Also, by being able to acquire information on the position and orientation of another client device in the real-world coordinate system, it is also possible to easily compute the distance in the real-world coordinate system between one's own device and an object recognized as another client device. Thus, it also becomes possible to conduct processing such as initiating the transmitting or receiving of data with a nearby client device in the case where the distance to the other client device is less than a given threshold value, or in other words, in the case where client devices are in actual proximity.

Also, since the position and orientation of a virtual object Ar placed in the real-world coordinate system by another client device can also be acquired, it is also possible to conduct processing such that, in the case where a virtual object Ar is moved to a position near one's own device by a user operation, the actual data expressed as the virtual object Ar is transferred from that client device to one's own device, for example.

If at this point images, marks, or photos, etc. abstractly indicating video data and audio data are drawn as virtual objects Ar, and if these virtual objects Ar are internally linked to the actual data in the devices, information such as video image and audio data can also be transmitted among client devices.

[4. Modifications]

Although an example is given in the above embodiment in which still image or other data is displayed as a virtual object Ar in the case where a touch operation is input by a user with respect to a touch panel 107a, an embodiment is not limited thereto. For example, the trail of an operation input with respect to the touch panel 107a may be drawn directly as a virtual object Ar, or an event indicated by an operation trail may be displayed as a virtual object Ar.

Figure 19A:
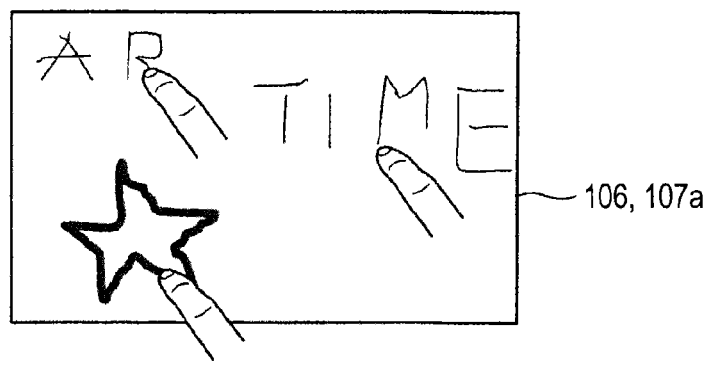
FIGS. 19A-19B are explanatory diagrams according to an embodiment of the present disclosure, illustrating an exemplary case in which virtual objects are generated on the basis of trail information for operations made with respect to a touch panel.
Figure 19B:
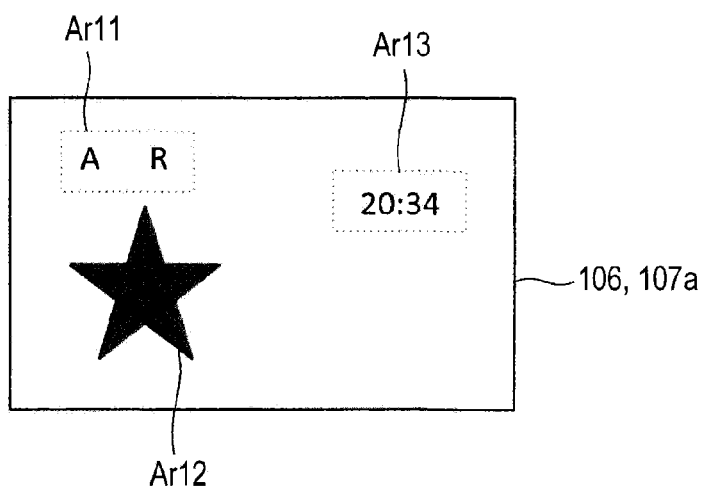

For example, in the case where the letters "AR" and a star shape are input by a user's finger as illustrated in FIG. 19A, the input "AR" letters and the star shape may be displayed directly as a virtual object Ar11 and a virtual object Ar12 at their input positions, as illustrated in FIG. 19B. Alternatively, in the case where the letters "TIME" are input as illustrated on the right side of FIG. 19A, the current time may be drawn as a virtual object Ar13, as illustrated on the right side of FIG. 19B.

Figure 20A:
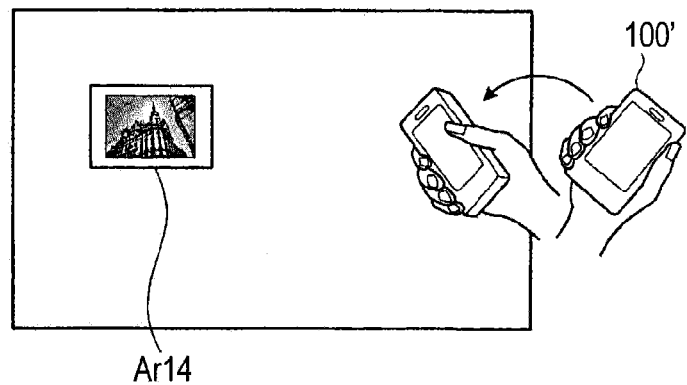
FIGS. 20A-20B are explanatory diagrams according to an embodiment of the present disclosure, illustrating an example of generating and placing virtual objects in the case of detecting an action of waving a mobile phone client device.
Figure 20B:
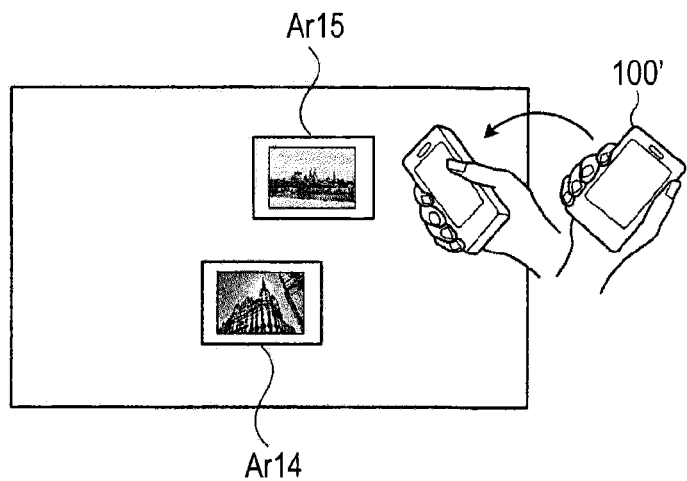

Also, the sensor that detects input from a user is not limited to the touch panel 107a, and another device able to detect motion imparted to the mobile phone client device 100, such as an acceleration sensor or angular velocity sensor, may also be used. For example, an arbitrary image may be displayed as a virtual object Ar14 at an arbitrary place on the screen of the display unit 106 in the case where a mobile phone client device 100' provided with an acceleration sensor or an angular velocity sensor is subjected to an up/down, forward/backward, or right/left waving action as input, as illustrated in FIG. 20A.

Also, in the case where an action of waving the mobile phone client device 100 is again performed, a different image from the image previously displayed as a virtual object Ar is displayed at a different position from the previous display position. At this point, it may be configured such that the display position of the previously displayed virtual object Ar14 is kept at the same position as previously, or placed at a randomly selected position.

Also, the microphone 105 (see FIG. 2) may be used as a sensor that detects input from a user. In this case, arbitrary data is placed as a virtual object Ar at an arbitrary place on screen in the case of detecting specific audio, such as the user's voice or a recorded sound source.

Figure 21A:
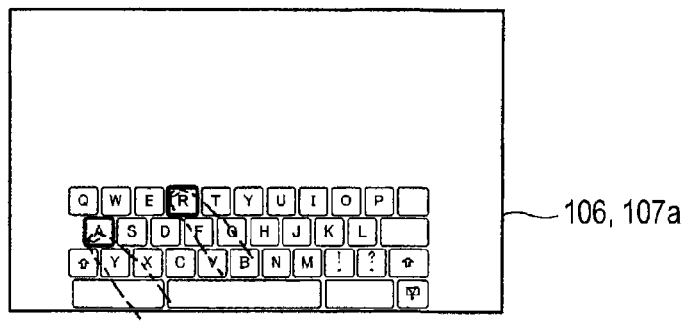
FIGS. 21A-21B are explanatory diagrams according to an embodiment of the present disclosure, illustrating an example of generating a virtual object on the basis of content input via a keyboard.
Figure 21B:
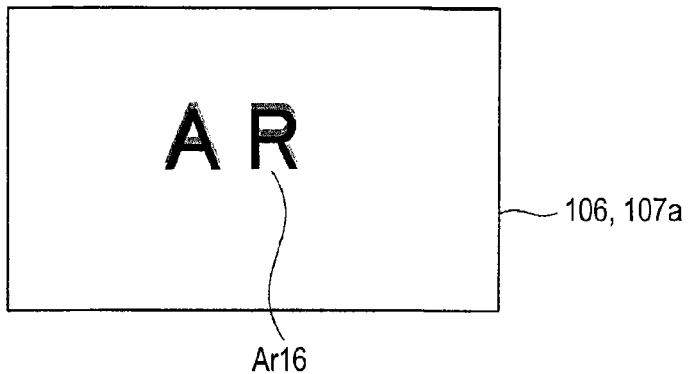

Also, an virtual object Ar may be generated using input information from an input device such as a keyboard or mouse, rather than a sensor. For example, in the case where the letters "A" and "R" are input with a keyboard as illustrated in FIG. 21A, the letters "AR" may be displayed on-screen as a virtual object Ar16.

Also, a graphic object to be displayed on-screen as a virtual object Ar is not limited to image data or text data. For example, objects such as missiles and beams used in a game application may also be drawn as virtual objects Ar. Specifically, the techniques of the present disclosure may also be used to realize a configuration in which virtual objects Ar such as missiles and beams are made to shoot forward in a direction orthogonal to the screen and from the position where a touch operation is made. Shared targets may also be placed in the real-world coordinate system and a game of knocking down or destroying the targets may be constructed.

According to a technique of the present disclosure, it is possible for respective client devices sharing a virtual space to ascertain, in nearly real-time, each other's positions and orientations as well as the positions and orientations of graphic objects drawn as virtual objects Ar. In addition, the above can be drawn at accurate positions and orientations. For this reason, even when such a game is constructed, it becomes possible to maintain high precision with respect to positioning and timing, which are crucial for games.

Also, a graphic object to be displayed on-screen as a virtual object Ar is not limited to being a 2D object, and may also be a 3D object.

Also, although an example is given in the above embodiment in which a common (single) real-world coordinate system for respective client devices sharing a virtual space can be constructed by including a common marker image—real-world coordinate system correspondence table 114a in the respective client devices sharing the virtual space, an embodiment is not limited thereto. For example, one particular client device may construct a given real-world coordinate system from a recognition image of a marker image, and information on that real-world coordinate system may be transmitted to other client devices wanting to share the virtual space. In addition, if a real-world coordinate system is constructed in each client device on the basis of such information, the same real-world coordinate system will be constructed in all client devices sharing the virtual space.

Note that the series of operations in the foregoing embodiment may be executed in hardware, and may also be executed in software. In the case of executing the series of operations in software, a program constituting such software may be executed by a computer built into special-purpose hardware, or alternatively, by a computer upon which programs for executing various functions are installed.

Also, a recording medium storing program code of software that realizes the functions of the foregoing embodiment may also be supplied to a system or apparatus. It is furthermore obvious that the functions are realized by a computer (or CPU or other control apparatus) in such a system or apparatus reading out and executing the program code stored in the recording medium.

The recording medium used to supply program code in this case may be a flexible disk, hard disk, optical disc, magneto-optical disc, CD-ROM, CD-R, magnetic tape, non-volatile memory card, or ROM, for example.

Also, the functions of the foregoing embodiment are realized by a computer executing read-out program code. In addition, some or all of the actual operations are conducted on the basis of instructions from such program code by an OS, etc. running on the computer. Cases where the functions of the foregoing embodiment are realized by such operations are also included.

Also, in this specification, the processing steps stating operations in a time series obviously encompass operations conducted in a time series following the described order, but also encompass operations executed in parallel or individually (for example, parallel processing or object-orientated processing), without strictly being processed in a time series.

Also, the configurations and operations described in the claims of the present disclosure are not limited to the example of the foregoing embodiment. It is to be understood as obvious by persons skilled in the art that various modifications, combinations, and other embodiments may occur depending on design or other factors insofar as they are within the scope of the claims or their equivalents.

In addition, the present disclosure may also take configurations like the following.

(1) An information processing apparatus comprising:
a communication interface that communicates with one or more other information processing apparatuses;
an imaging unit that captures an image corresponding to a subject and outputs the captured image;
a display unit that displays the captured image;
an image recognition unit that detects whether an image preset as a marker image exists in the captured image;
a storage unit storing data;
a spatial recognition unit that, when the marker image is detected by the image recognition unit, constructs a real-world coordinate system computed from a position and orientation of the marker image, and computes information corresponding to a position and orientation of the information processing apparatus in the constructed real-world coordinate system;
a virtual object display unit that acquires at least one of the data stored in the storage unit, data existing on a network, and data transmitted from the one or more other information processing apparatuses and received by the communication interface, places the acquired data in the constructed real-world coordinate system, and controls the display unit to display the acquired data as one or more virtual objects; and
a controller that controls the communication interface to transmit information corresponding to the position and orientation of the information processing apparatus in the constructed real-world coordinate system to the one or more other information processing apparatuses.

(2) The information processing apparatus of (1), wherein the spatial recognition unit constructs the real-world coordinate system based on parameters for setting coordinates in the real-world coordinate system that are predetermined in association with features of the marker image.

(3) The information processing apparatus of (1) or (2), further comprising:
a sensor that detects an operation input by a user, and outputs a detection signal based on the detection, wherein
the virtual object display unit controls the display unit to display the one or more virtual objects based on the detection signal output by the sensor.

(4) The information processing apparatus of (3), wherein the controller, based on a detection signal output from the sensor, controls the communication interface to transmit at least one of the information corresponding to the position and orientation of the information processing apparatus in the constructed real-world coordinate system, data stored in the storage unit, data existing on the network, and information corresponding to a position and orientation of the acquired data in the real-world coordinate system to the one or more information processing apparatuses.

(5) The information processing apparatus of any of (1) to (4), wherein
the communication interface acquires data transmitted from the one or more other information processing apparatuses, and
the virtual object display unit places the acquired data in the real-world coordinate system based on information corresponding to a position and orientation of the acquired data in the real-world coordinate system received together with the data, and controls the display unit to display the acquired data as one or more virtual objects at positions on the display unit corresponding to the acquired information corresponding to the position and orientation of the acquired data.

(6) The information processing apparatus of any of (1) to (5), wherein
the controller controls the communication interface to transmit at least one of information corresponding to a position and orientation of the information processing apparatus in the constructed real-world coordinate system, data stored in the storage unit, data existing on the network, and information on a position and orientation of the data in the real-world coordinate system to the one or more other information processing apparatuses at predetermined time intervals.

(7) The information processing apparatus of any of (3) to (6), further comprising:

a graphic object determining unit that determines a graphic object to be displayed as a virtual object by the virtual object display unit according to a detection signal output from the sensor.

(8) The information processing apparatus of any of (3) to (7), wherein the virtual object display unit, based on a detection signal output from the sensor, controls the display unit to display the acquired data as the one or more virtual objects in an orientation facing forward with respect to the display unit.

(9) The information processing apparatus of any of (3) to (8), wherein the sensor is a touch sensor stacked on or formed integrally with the display unit and detects positions touched by an operation element and outputs the detected positions as position information, and the virtual object display unit controls a position of a virtual object on the display unit based on the position information output from the touch sensor.

(10) The information processing apparatus of any of (1) to (9), wherein the communication interface receives information corresponding to a position and orientation of one of the one or more another information processing apparatuses in the real-world coordinate system, and the virtual object display unit controls the display unit to display a virtual object representing the one of the one or more another information processing apparatuses based on the received information corresponding to the position and orientation of one of the one or more another information processing apparatuses in the real-world coordinate system.

(11) The information processing apparatus of any of (1) to (10), wherein the spatial recognition unit computes a distance to one of the one or more other information processing apparatuses in the real-world coordinate system based on information corresponding to a position and orientation of the one of the one or more other information processing apparatus in the real-world coordinate system received via the communication interface, and the virtual object display unit controls the display to display a virtual object indicating the distance.

(12) The information processing apparatus of any of (1) to (11), wherein the spatial recognition unit computes a distance to one of the one or more other information processing apparatuses in the real-world coordinate system based on information corresponding to a position and orientation of the one of the one or more other information processing apparatuses in the real-world coordinate system received via the communication interface, and the controller controls the communication interface to transmit data stored in the storage unit or data existing on the network to the one of the one or more other information processing apparatuses when the distance in the real-world coordinate system is less than a predetermined distance.

(13) The information processing apparatus of any of (1) to (12), wherein the spatial recognition unit computes a distance between data displayed as a virtual object and the information processing apparatus in the real-world coordinate system based on information corresponding to a position and orientation in the real-world coordinate system of the data displayed as a virtual object received from one of one or more another information processing apparatuses received via the communication interface, and the controller controls the communication interface to transmit data stored in the storage unit or data existing on the network to the one of the one or more other information processing apparatuses when the distance in the real-world coordinate system between the virtual object being drawn by the one of the one or more information processing apparatuses and the information processing apparatus is less than a predetermined distance.

(14) The information processing apparatus of any of (9) to (13), further comprising:

a graphic object determining unit that determines a graphic object to be displayed as a virtual object by the virtual object display unit according to a number of inputs detected by the touch sensor, and the virtual object display unit controls the display unit to display the graphic object as a virtual object at a position where the touch sensor was touched.

(15) The information processing apparatus of any of (9) to (14), further comprising:

a graphic object determining unit that determines a graphic object to be displayed as a virtual object by the virtual object display unit according to a trail of touch positions detected by the touch sensor, and the virtual object display unit controls the display to display the graphic object as a virtual object at a position corresponding to where the touch sensor was touched.

(16) The information processing apparatus of any of (3) to (15), further comprising:

a graphic object determining unit that determines a graphic object to be displayed as a virtual object by the virtual object display unit according to a detection signal output from the sensor, wherein the sensor is an acceleration sensor or an angular velocity sensor, the graphic object determining unit changes data to select as a graphic object from among the data stored in the storage unit or the data existing on the network according to a number of times a waving action is performed when it is determined, based on the detection signal output from the acceleration sensor or the angular velocity sensor, that the client device has been waved by the user, and the virtual object display unit controls the display to display the data selected by the graphic object determining unit as a virtual object at an arbitrary on-screen position on the display unit.

(17) The information processing apparatus of any of (1) to (16), further comprising:

an operation input unit that accepts an input operation by the user, and outputs an operation signal according to the input operation; and a graphic object determining unit that determines data displayed as a graphic object based on the operation signal output by the operation input unit, wherein the virtual object display unit controls the display to display the data selected by the graphic object determining unit as a virtual object at an arbitrary on-screen position on the display unit.

(18) The information processing apparatus of any of (1) to (17), further comprising:

a microphone that picks up surrounding audio and generates an audio signal; and a graphic object determining unit that determines data displayed as a graphic object based on features in the audio signal generated by the microphone, wherein the virtual object display unit controls the display to display the data selected by the graphic object determining unit as a virtual object at an arbitrary on-screen position on the display unit.

(19) An information processing method performed by an information processing apparatus, the method comprising:
capturing a subject and outputting image data corresponding to the captured subject;
displaying the captured image;
detecting whether an image preset as a marker image exists in the image data;
constructing, when the marker image is detected in the image data, a real-world coordinate system computed from a position and orientation of the marker image;
computing information corresponding to the information processing apparatus's position and orientation in the constructed real-world coordinate system;
acquiring at least one of data stored in a storage unit of the information processing apparatus, data existing on a network, and data transmitted from another information processing apparatus;
placing the acquired data in the constructed real-world coordinate system;
displaying the acquired data as one or more virtual objects at on-screen positions of a display corresponding to positions where the acquired data was placed; and
transmitting information corresponding to a position and orientation of the information processing apparatus in the constructed real-world coordinate system to the another information processing apparatus.

(20) A non-transitory computer-readable medium including computer program instructions, which when executed by an information processing apparatus, cause the information processing apparatus to perform a process comprising:
capturing a subject and outputting image data corresponding to the captured subject;
displaying the captured image;
detecting whether an image preset as a marker image exists in the image data;
constructing, when the marker image is detected in the image data, a real-world coordinate system computed from a position and orientation of the marker image;
computing information corresponding to the information processing apparatus's position and orientation in the constructed real-world coordinate system;
acquiring at least one of data stored in a storage unit of the information processing apparatus, data existing on a network, and data transmitted from another information processing apparatus;
placing the acquired data in the constructed real-world coordinate system;
displaying the acquired data as one or more virtual objects at on-screen positions of a display corresponding to positions where the acquired data was placed; and transmitting information corresponding to a position and orientation of the information processing apparatus in the constructed real-world coordinate system to the another information processing apparatus.

The invention claimed is:

1. An information processing apparatus comprising:
a communication interface that communicates with one or more other information processing apparatuses;
an imaging circuit that captures an image corresponding to a subject and outputs the captured image;
a display circuit that displays the captured image;
a storage circuit storing data;
a sensor that detects an operation input by a user, and outputs a detection signal based on the detection, wherein the sensor comprises a touch sensor stacked on or formed integrally with the display circuit and detects positions touched by an operation element and outputs the detected positions as position information; and
circuitry configured to
detect whether an image preset as a marker image exists in the captured image;
construct, when the marker image is detected, a real-world coordinate system computed from a position and orientation of the marker image, and compute information corresponding to a position and orientation of the information processing apparatus in the constructed real-world coordinate system;
acquire at least one of the data stored in the storage circuit, data existing on a network, and data transmitted from the one or more other information processing apparatuses and received by the communication interface, place the acquired data in the constructed real-world coordinate system, and control the display circuit to display the acquired data as one or more virtual objects;
control the communication interface to transmit information corresponding to the position and orientation of the information processing apparatus in the constructed real-world coordinate system to the one or more other information processing apparatuses;
store a correspondence table relating predetermined graphic objects to be displayed with numbers of inputs to be detected by the touch sensor;
determine one or more of the predetermined graphic objects to be displayed according to a number of inputs detected by the touch sensor in accordance with the correspondence table; and
control the display circuit to display the one or more virtual objects based on the position information output from the touch sensor and to display the one or more predetermined graphic objects as one or more of the one or more virtual objects.

2. The information processing apparatus of claim 1, wherein
the circuitry constructs the real-world coordinate system based on parameters for setting coordinates in the real-world coordinate system that are predetermined in association with features of the marker image.

3. The information processing apparatus of claim 1, wherein
the circuitry, based on a detection signal output from the sensor, controls the communication interface to transmit at least one of the information corresponding to the position and orientation of the information processing apparatus in the constructed real-world coordinate system, data stored in the storage circuit, data existing on the network, and information corresponding to a position and orientation of the acquired data in the real-world coordinate system to the one or more information processing apparatuses.

4. The information processing apparatus of claim 1, wherein
the communication interface acquires data transmitted from the one or more other information processing apparatuses, and
the circuitry places the acquired data in the real-world coordinate system based on information corresponding to a position and orientation of the acquired data in the real-world coordinate system received together with the data, and controls the display circuit to display the acquired data as one or more virtual objects at positions on the display circuit corresponding to the acquired information corresponding to the position and orientation of the acquired data.

5. The information processing apparatus of claim 1, wherein
the circuitry controls the communication interface to transmit at least one of information corresponding to a position and orientation of the information processing apparatus in the constructed real-world coordinate system, data stored in the storage circuit, data existing on the network, and information on a position and orientation of the data in the real-world coordinate system to the one or more other information processing apparatuses at predetermined time intervals.

6. The information processing apparatus of claim 1, wherein
the circuitry, based on a detection signal output from the sensor, controls the display circuit to display the acquired data as the one or more virtual objects in an orientation facing forward with respect to the display circuit.

7. The information processing apparatus of claim 1, wherein
the communication interface receives information corresponding to a position and orientation of one of the one or more other information processing apparatuses in the real-world coordinate system, and
the circuitry controls the display circuit to display a virtual object representing the one of the one or more other information processing apparatuses based on the information corresponding to the position and orientation of one of the one or more other information processing apparatuses in the real-world coordinate system.

8. The information processing apparatus of claim 1, wherein
the circuitry computes a distance to one of the one or more other information processing apparatuses in the real-world coordinate system based on information corresponding to a position and orientation of the one of the one or more other information processing apparatus in the real-world coordinate system received via the communication interface, and
the circuitry controls the display circuit to display a virtual object indicating the distance.

9. The information processing apparatus of claim 1, wherein
the circuitry computes a distance to one of the one or more other information processing apparatuses in the real-world coordinate system based on information corresponding to a position and orientation of the one of the one or more other information processing apparatuses in the real-world coordinate system received via the communication interface, and
the circuitry controls the communication interface to transmit data stored in the storage circuit or data existing on the network to the one of the one or more other information processing apparatuses when the distance in the real-world coordinate system is less than a predetermined distance.

10. The information processing apparatus of claim 1, wherein
the circuitry computes a distance between data displayed as a virtual object and the information processing apparatus in the real-world coordinate system based on information corresponding to a position and orientation in the real-world coordinate system of the data displayed as a virtual object received from one of one or more other information processing apparatuses received via the communication interface, and
the circuitry controls the communication interface to transmit data stored in the storage circuit or data existing on the network to the one of the one or more other information processing apparatuses when the distance in the real-world coordinate system between the virtual object being drawn by the one of the one or more information processing apparatuses and the information processing apparatus is less than a predetermined distance.

11. The information processing apparatus of claim 1, wherein the circuitry controls the display circuit to display the one or more predetermined graphic objects at a position or positions where the touch sensor was touched.

12. The information processing apparatus of claim 1, wherein:
the circuitry determines the one or more predetermined graphic objects to be displayed according to a trail of touch positions detected by the touch sensor, and
the circuitry controls the display circuit to display the one or more predermined graphic objects at a position or positions corresponding to where the touch sensor was touched.

13. The information processing apparatus of claim 1, wherein:
the circuitry determines the one or more predetermined graphic objects to be displayed according to a detection signal output from the sensor, wherein
the sensor further comprises an acceleration sensor or an angular velocity sensor,
the circuitry changes data to select as the one or more predetermined graphic objects from among the data stored in the storage circuit or the data existing on the network according to a number of times a waving action of a client device is performed when it is determined, based on the detection signal output from the acceleration sensor or the angular velocity sensor, that the client device has been waved by the user, and
the circuitry controls the display circuit to display the data selected at an arbitrary on-screen position on the display circuit.

14. The information processing apparatus of claim 1, wherein:
the circuitry controls the display circuit to display the acquired data at an arbitrary on-screen position on the display circuit.

15. The information processing apparatus of claim 1, further comprising a microphone that picks up surrounding audio and generates an audio signal, wherein
the circuitry controls the display circuit to display the acquired data at an arbitrary on-screen position on the display circuit.

16. An information processing method performed by an information processing apparatus, the method comprising:
capturing a subject and outputting image data corresponding to the captured subject;
displaying the captured image;
detecting whether an image preset as a marker image exists in the image data;
constructing, when the marker image is detected in the image data, a real-world coordinate system computed from a position and orientation of the marker image;
computing information corresponding to the information processing apparatus's position and orientation in the constructed real-world coordinate system;

acquiring at least one of data stored in a storage circuit of the information processing apparatus, data existing on a network, and data transmitted from another information processing apparatus;

detecting an operation input by a user through a touch sensor and outputting a detection signal comprising position information indicating positions touched by the user;

placing the acquired data in the constructed real-world coordinate system;

displaying the acquired data as one or more virtual objects at on-screen positions of a display corresponding to positions where the acquired data was placed; and transmitting information corresponding to a position and orientation of the information processing apparatus in the constructed real-world coordinate system to the another information processing apparatus;

wherein said displaying comprises:

storing a correspondence table relating predetermined graphic objects to be displayed with numbers of inputs to be detected by the touch sensor;

determining one or more of the predetermined graphic objects to be displayed according to a number of inputs detected by the touch sensor in accordance with the correspondence table; and displaying the one or more virtual objects based on the position information output from the touch sensor and displaying the one or more predetermined graphic objects as one or more of the one or more virtual objects.

17. A non-transitory computer-readable medium including computer program instructions, which when executed by an information processing apparatus, cause the information processing apparatus to perform a process comprising:

capturing a subject and outputting image data corresponding to the captured subject;

displaying the captured image;

detecting whether an image preset as a marker image exists in the image data;

constructing, when the marker image is detected in the image data, a real-world coordinate system computed from a position and orientation of the marker image;

computing information corresponding to the information processing apparatus's position and orientation in the constructed real-world coordinate system;

acquiring at least one of data stored in a storage circuit of the information processing apparatus, data existing on a network, and data transmitted from another information processing apparatus;

detecting an operation input by a user through a touch sensor and outputting a detection signal comprising position information indicating positions touched by the user;

placing the acquired data in the constructed real-world coordinate system;

displaying the acquired data as one or more virtual objects at on-screen positions of a display corresponding to positions where the acquired data was placed; and transmitting information corresponding to a position and orientation of the information processing apparatus in the constructed real-world coordinate system to the another information processing apparatus;

wherein said displaying comprises:

storing a correspondence table relating predetermined graphic objects to be displayed with numbers of inputs to be detected by the touch sensor;

determining one or more of the predetermined graphic objects to be displayed according to a number of inputs detected by the touch sensor in accordance with the correspondence table; and displaying the one or more virtual objects based on the position information output from the touch sensor and displaying the one or more predetermined graphic objects as one or more of the one or more virtual objects.

* * * * *